(12) United States Patent
Mendoza et al.

(10) Patent No.: US 10,940,433 B2
(45) Date of Patent: *Mar. 9, 2021

(54) METHODS FOR CARBON DIOXIDE CAPTURE

(71) Applicants: Eduin Yesid Mora Mendoza, Miami, FL (US); Vadym Drozd, Miami, FL (US); Andriy Durygin, Miami, FL (US); Surendra K. Saxena, Miami, FL (US)

(72) Inventors: Eduin Yesid Mora Mendoza, Miami, FL (US); Vadym Drozd, Miami, FL (US); Andriy Durygin, Miami, FL (US); Surendra K. Saxena, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/679,569

(22) Filed: Nov. 11, 2019

(65) Prior Publication Data

US 2020/0246746 A1 Aug. 6, 2020

Related U.S. Application Data

(63) Continuation of application No. 16/263,688, filed on Jan. 31, 2019, now Pat. No. 10,549,232.

(51) Int. Cl.
*B01D 53/02* (2006.01)
*B01D 53/14* (2006.01)
(Continued)

(52) U.S. Cl.
CPC ..... *B01D 53/1475* (2013.01); *B01D 53/1406* (2013.01); *B01J 20/0277* (2013.01);
(Continued)

(58) Field of Classification Search
CPC ............ B01D 53/1475; B01D 53/1406; B01D 2252/10; B01D 2257/504; B01D 2258/025; B01D 2259/816; B01J 20/0277; B01J 20/06; B01J 20/3483; B01J 2220/4806
See application file for complete search history.

(56) References Cited

U.S. PATENT DOCUMENTS 3,920,800 A * 11/1975 Harris .................... C01F 11/181
423/432
5,135,572 A * 8/1992 Ibaraki .................... C21B 13/14
75/502
(Continued)

*Primary Examiner* — Christopher P Jones
(74) *Attorney, Agent, or Firm* — Saliwanchik, Lloyd & Eisenschenk

(57) ABSTRACT

The subject invention provides systems and methods for capturing carbon dioxide in a cyclic process of mechano-chemical reactions. The subject invention also provides systems and methods for synthesizing siderite, by means of mechano-chemical reactions, using mill rotation. Siderite acts as an efficient reversible sorbent and can be decomposed, generating magnetite, carbon and/or metallic iron as well as pure carbon dioxide. Said systems and methods employing carbon dioxide capture/release reactions in the carbonation-calcination cycles are suitable for using in any iron, steel and non-steel industries to reduce carbon dioxide emissions into the atmosphere.

20 Claims, 13 Drawing Sheets

(51) Int. Cl.
  *B01J 20/06* (2006.01)
  *B01J 20/34* (2006.01)
  *B01J 20/02* (2006.01)
(52) U.S. Cl.
  CPC ........... *B01J 20/06* (2013.01); *B01J 20/3483* (2013.01); *B01D 2252/10* (2013.01); *B01D 2257/504* (2013.01); *B01D 2258/025* (2013.01); *B01D 2259/816* (2013.01); *B01J 2220/4806* (2013.01)

(56) References Cited

U.S. PATENT DOCUMENTS

| | | | |
|---|---|---|---|
| 6,143,065 A * | 11/2000 | Freeman | C01F 11/18 106/464 |
| 7,247,601 B1 | 7/2007 | Hills et al. | |
| 7,829,053 B2 * | 11/2010 | Constantz | B01D 53/1418 423/158 |
| 7,887,694 B2 * | 2/2011 | Constantz | C04B 7/367 205/480 |
| 8,603,222 B2 * | 12/2013 | Sceats | B01D 53/62 95/107 |
| 9,808,759 B2 * | 11/2017 | Balfe | B01D 53/62 |
| 2001/0033820 A1 * | 10/2001 | Yaniv | A61K 8/19 423/432 |
| 2003/0051841 A1 * | 3/2003 | Mathur | C01B 33/24 162/181.1 |
| 2015/0152784 A1 | 6/2015 | Kumar et al. | |
| 2017/0240432 A1 * | 8/2017 | Jung | C01F 11/181 |
| 2017/0369329 A1 * | 12/2017 | Paynter | C01F 11/181 |
| 2019/0127273 A1 * | 5/2019 | Lorgouilloux | B01J 20/3021 |

\* cited by examiner

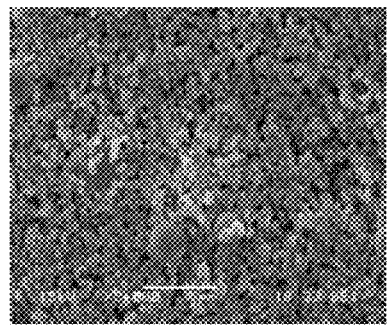 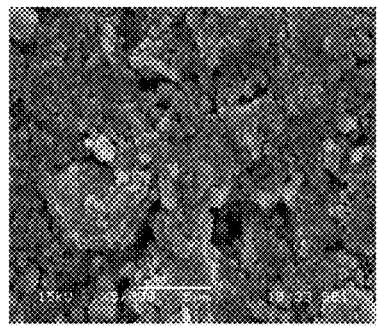 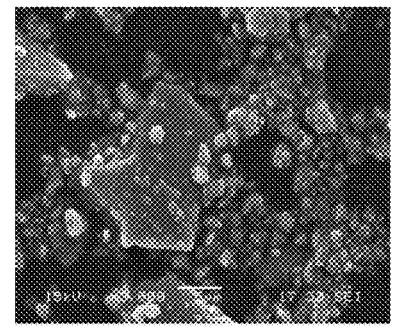
FIG. 13A  FIG. 13B  FIG. 13C
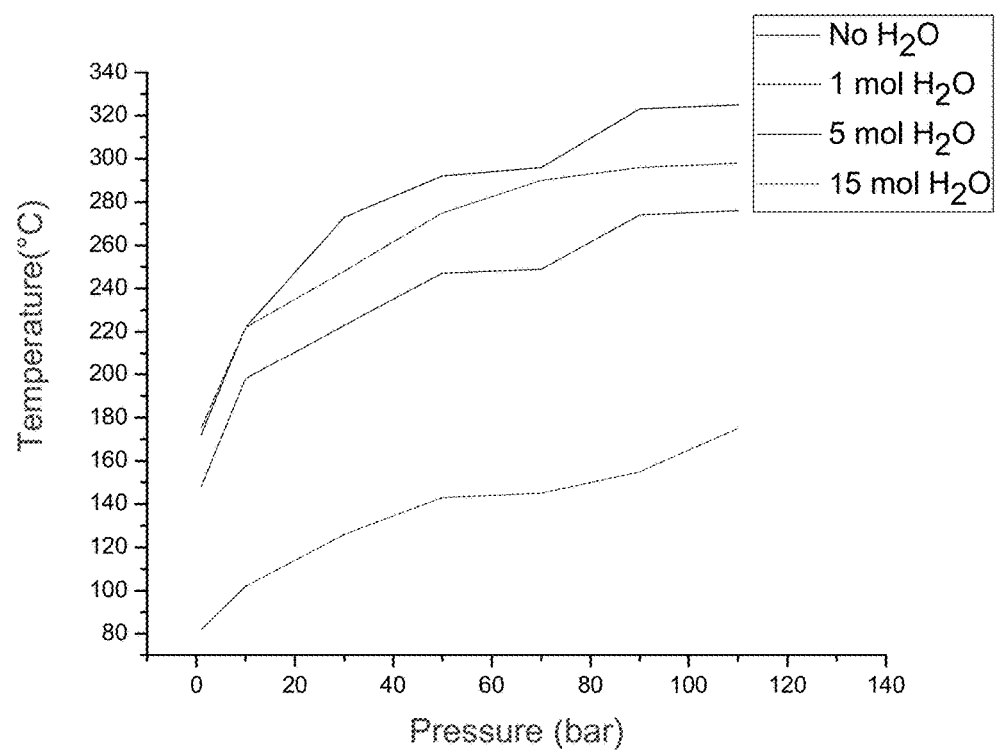
FIG. 14

METHODS FOR CARBON DIOXIDE CAPTURE

CROSS-REFERENCE TO A RELATED APPLICATION

This application is a continuation application of U.S. Ser. No. 16/263,688, filed Jan. 31, 2019, which is incorporated herein by reference in its entirety.

TECHNICAL FIELD

This disclosure relates to a method for carbon dioxide capture. Specifically, the present invention utilizes a cycled process where the material improves its capture properties with the subsequent capture while pure carbon dioxide is stored. The method can be used in steel or non-steel industries.

BACKGROUND OF THE INVENTION

The emission of carbon dioxide ($CO_2$) has been rising for the last several decades as a result of increasing use of fossil fuel by different sectors of industry. In 2011, the emissions of $CO_2$ into the atmosphere reached over 34.000 million metric tons. In 2015, the $CO_2$ concentration in the atmosphere increased to 401 parts per million (ppm), which is 110 ppm more than at the start of the industrial revolution and contributing to more than 60% of the global warming. As a consequence, global temperature has increased ~1° C. in the last 50 years. If the use of fossil fuels continues at this or increasing rate over the next 50 years, the $CO_2$ concentration in the atmosphere could reach 580 ppm, causing significant global effects on living organisms and ecosystems.

Conventional technologies for $CO_2$ capture and sequestration from blast furnace gasses (BFG) are based on either physical or chemical methods. In physical methods, $CO_2$ is absorbed by a solid or liquid under various pressures and temperatures and is released by the absorbents upon decompression and/or heating. For example, physical absorption methods include pressure swing absorption, and vacuum pressure swing absorption.

While physical absorption requires higher $CO_2$ partial pressures, chemical absorption is appropriate for $CO_2$ capture from gases with low $CO_2$ partial pressures. The chemical absorption methods are based on chemical reactions between the absorbent and $CO_2$. Organic amines are the most common absorbents, including monoethanolamine (MEA), monoethanolamine/piperazine mix, and sterically hindered primary amines. $CO_2$ removal by absorption and regeneration with aqueous ammonia solution is a mature and widely used method. Amine absorption, however, is costly and energy intensive due to the relatively low $CO_2$ absorption capacity (0.4 $t_{CO2}$ $t^{-1}_{MEA}$). Using amine systems to capture 90% of $CO_2$ emitted from a flue gas of fossil-fuel power plant could cost up to 30% of the electricity generated by the plant. MEA solvent based absorbents have also been criticized because of their low absorption capacity, corrosive nature, and fast degradation of absorption capacity in the presence of exhaust gas.

Adsorption and $CO_2$ membranes are two other technologies that have been developed. For example, $CO_2$ selective membranes provide a viable energy-saving alternative for $CO_2$ separation from flue or fuel gas because membranes do not require any phase transformation. However, this technology is not considered as a suitable solution due to the selectivity and stability of the membranes, the structure and permeation properties of the membranes, and the transport mechanism applied in the membranes.

Siderite is a commercial mineral and has many applications such as a source of iron in the steel industry, raw material in cement industry, hydrogen production, refining of ferrosilicon, and shale oil production. In nature, carbonate minerals are part of various rocks mainly represented by the quaternary system $FeCO_3$—$MgCO_3$—$CaCO_3$—$MnCO_3$. Natural samples of iron carbonate show different amounts of substitutions of Mg, Ca, Mn for Fe in the lattice, which suggests that pure siderite seldom occurs. Natural siderite forms complete series of solid solutions with magnesium and manganese carbonates, while a wide miscibility gap has been reported between iron and calcium carbonates. Solubility of $Ca^{2+}$ in siderite does not exceed 10 mol. % at 550° C., while calcite ($CaCO_3$) can contain up to 20 mol. % of $Fe^{2+}$ at the same temperature.

The thermal decomposition of siderite is a very important issue mainly in the processing of oil shales or in the combustion of coals. The mechanism of the thermal decomposition of siderite is complicated and depends both on its composition and experimental conditions. There is a remarkable difference in the thermal decomposition behavior of natural and synthetic siderite. For example, the decomposition temperature of synthetic siderite is approximately 200 K below the decomposition temperature of the natural sample. Formation of solid solutions between $FeCO_3$ and other metal carbonates increases the decomposition temperature of natural siderite samples compared to synthetic ones. Temperature, atmosphere, microstructure, heating rate are experimental parameters that determine phase composition of siderite decarbonation products.

Therefore, there is a need to develop novel systems and methods for capturing $CO_2$, reducing its emission from, for example, steel industry and separating $CO_2$ from fossil fuel. There is also a need for siderite synthesis and decomposition, in particular, at ambient conditions.

BRIEF SUMMARY OF THE INVENTION

The subject invention provides systems and methods for capturing $CO_2$ and synthesizing siderite for reducing $CO_2$ emission to the atmosphere. The systems and methods can be used in various industrial sectors such as cement, steel iron and power generation industries.

In one embodiment, the systems and methods for capturing $CO_2$ employ mechano-chemical reactions (chemical reactions that are achieved by the direct influence of mechanical energy) using materials comprising metal oxides. The systems and methods sequestrate $CO_2$, for example, in the form of metal carbonates, e.g., siderite.

The metal carbonates can then be heated to release pure $CO_2$ gas, and regenerate the metal oxides that can then be recovered and reused. Normally, carbonation reactions are exothermic and carbonate decomposition reactions are endothermic, which allow the design of a cyclic process involving both carbonation and calcination.

In one embodiment, the system for capturing $CO_2$ utilizes a cyclic process of carbonation of materials such as metal oxides and calcination of the products obtained from the carbonation reactions. Carbonation of metal oxides occurs in the presence of $CO_2$ that is produced by industrial processes. Calcination reaction regenerates the materials (e.g. metal oxides) which can be used in subsequent carbonation cycle.

In one embodiment, the subject invention provides a system for capturing carbon dioxide, comprising a carbonation reactor comprising a first port for receiving the reaction materials, a second port for receiving a stream of gaseous carbon dioxide, and a grinding mechanism inside the carbonation reactor, the reaction materials reacting with carbon dioxide to form carbonates; and a calcination reactor comprising a first port for receiving carbonates produced in the carbonation reactor, the carbonates being decomposed in the calcination reactor at, preferably, room temperature conditions to regenerate the reaction materials.

In one embodiment, the carbonation reactor also comprises a third port for obtaining the metal carbonates. The calcination reactor also comprises a second port for releasing the reproduced reaction materials, which can be recycled back to the carbonation reactor for subsequent carbonation and calcination cycles.

In one embodiment, the grinding mechanism comprises grinding balls for grinding the reaction materials to increase the efficiency of the carbonation reaction.

In a preferred embodiment, the carbonation reactor is a ball mill vessel such that a series of mechano-chemical reactions occurs in the vessel during its motion, which allows the grinding of reaction materials by grinding balls in the vessel (i.e., mechanical reactions) and the carbonation reaction between reaction materials and $CO_2$ (i.e., chemical reactions).

In one embodiment, the reaction mixture also comprises a reducing agent. Preferably, the reducing agent is selected from carbon and metallic iron. Carbon and metallic iron are used due to their thermodynamic properties and high availability. Carbon can be used in crystalline or amorphous forms like graphite, coal, coke, charcoal, soot, etc. Moreover, iron can be produced on site where carbon dioxide capture takes place, e.g., steel mill. Carbon is a preferred reducing agent because it is cheaper than metallic irons.

In one embodiment, the system may further comprises a sonication unit that provides ultrasound waves for intensification of carbonation reactions. The sonication unit can comprise one or more ultrasonic transducers providing ultrasound waves having frequencies in the range of kHz.

In one embodiment, the carbonation reactor comprises a mixture of reaction materials. The reaction materials comprise metal oxides such as iron oxides and iron hydroxides. In a further embodiment, the reaction materials comprise, for example, i) magnetite and iron, ii) hematite and iron, iii) magnetite and carbon, iv) hematite and goethite, v) hematite, vi) goethite and/or vii) wustite.

In one embodiment, the subject invention provides a method for capturing $CO_2$ employing mechano-chemical reactions using the system according to the subject invention. The method comprises passing a stream of gas comprising $CO_2$ through the system according to the subject invention, and capturing $CO_2$ by forming carbonates.

In one embodiment, the subject invention provides a method for carbon dioxide capture by means of reactions that use magnetite, hematite or goethite joined with iron or carbon. Mixtures of magnetite, hematite or goethite with iron or carbon react with carbon dioxide to form siderite $FeCO_3$. Siderite is widely used in other industrial processes. Pure carbon dioxide can be obtained by decomposing siderite. The method is inexpensive compared to other methods in the art, and is effective in capturing carbon dioxide.

In one embodiment, the subject invention provides a method for synthesizing siderite, the method comprising passing a stream of gas comprising $CO_2$ through the system according to the subject invention, forming siderite and optionally, separating siderite from the carbonation reactor.

In another embodiment, the subjection invention provides a method to generate carbon dioxide from siderite, preferably, at room temperature conditions. In some embodiments, carbon and/or metallic iron are obtained as products after siderite decomposition.

In one embodiment, the reaction materials such as magnetite and hematite can act as an efficient reversible sorbent of carbon dioxide for a plurality number of carbonation-calcination cycles due to increases in the surface area with the increased number of cycles during the mechano-chemical treatment.

BRIEF DESCRIPTION OF THE DRAWINGS

FIGS. 13A-13C show SEM images of (13A) as received Fe3O4 and Fe (13B) 2 h ball milled (13C) after four carbonation-calcination cycles at magnification of ×5000, ×5000 and ×3000, respectively.

FIG. 14 is a graph of equilibrium temperature as a function of pressure for the system $2Fe_3O_4+C+5CO_2 \rightarrow 6FeCO_3$ including different amounts of water.

DETAILED DESCRIPTION OF THE INVENTION

Figure 1:
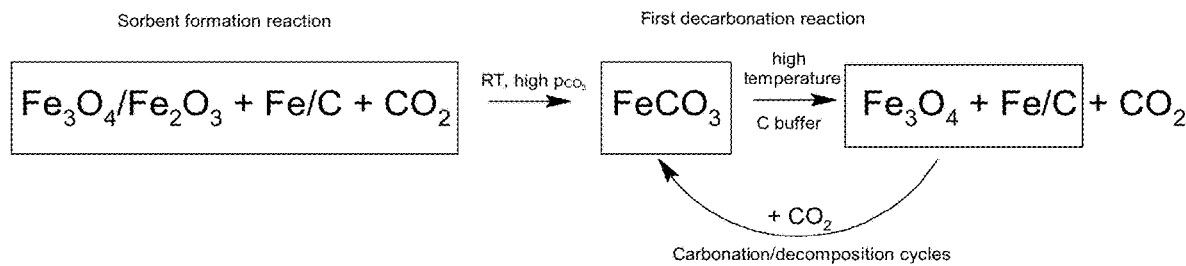
FIG. 1 shows a scheme of carbon dioxide capture via siderite.
Figure 2:
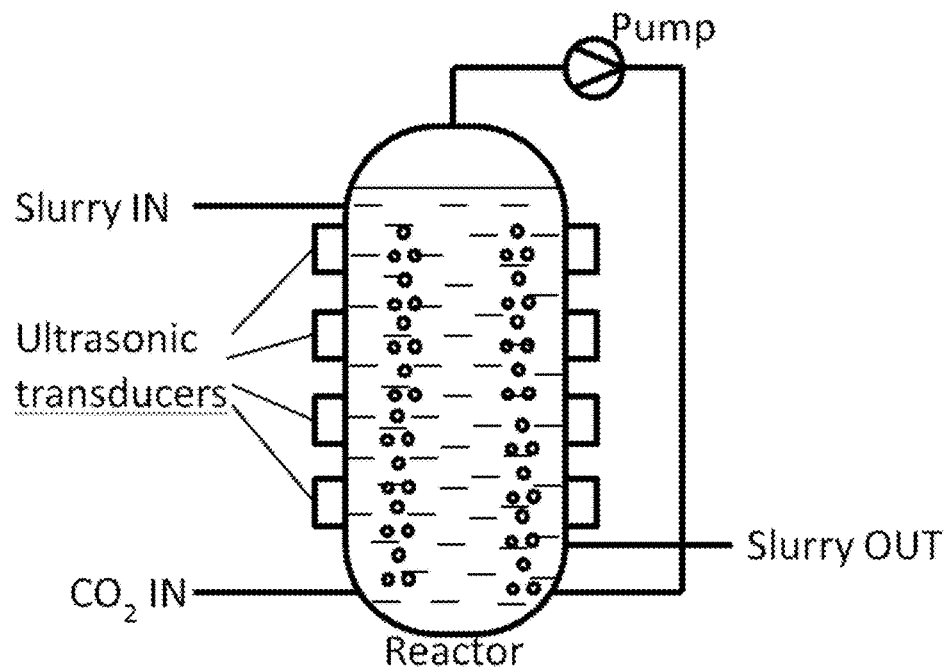
FIG. 2 shows an exemplary reactor according to the subject invention.

The subject invention provides systems and methods for capturing $CO_2$, particularly, in industries such as the iron and steel industries. In one embodiment, the system and method for capturing $CO_2$ employ mechano-chemical reactions (chemical reactions that are achieved by the direct influence of mechanical energy) using materials comprising metal oxides and iron hydroxides, such as CaO, MgO, wustite (FeO), hematite ($Fe_2O_3$), magnetite ($Fe_3O_4$) and goethite (FeOOH). The systems and methods can sequestrate $CO_2$, for example, in the form of siderite.

Specifically, metal oxides react with $CO_2$ to form metal carbonates and sequester $CO_2$. The metal carbonates can then be heated to release pure $CO_2$ gas, and regenerate the metal oxides that can be recovered and reused. Normally, carbonation reactions are exothermic and carbonate decomposition reactions are endothermic, which allow the design of a cyclic process involving both carbonation and calcination. The carbonation and calcination reactions can occur in one reactor, or in separated reactors, e.g., a carbonation reactor and a calcination reactor.

In one embodiment, the subject invention also provides systems and methods for synthesizing siderite from materials comprising metal oxides and $CO_2$. Advantageously, $CO_2$ is produced in industrial plants and thus available at no cost. The carbon dioxide may be obtained at relatively high temperature or at room temperature condition. Because the reaction of $CO_2$ with the reaction mixture is exothermic, no additional heating is required.

In one embodiment, the system for capturing carbon dioxide, comprising a carbonation reactor comprising a first port for receiving the reaction materials, a second port for receiving a stream of gaseous carbon dioxide, and a grinding mechanism inside the carbonation reactor for grinding reaction materials, the reaction materials reacting with carbon dioxide to form carbonates; and a calcination reactor comprising a first port for receiving carbonates produced in the carbonation reactor, the carbonates being decomposed in the calcination reactor at room temperature condition to reproduce the reaction materials.

In one embodiment, the carbonation reactor comprises a mixture of reaction materials. The reaction material comprises metal oxides including calcium oxide, magnesium oxide, iron oxides such as wustite, hematite, and magnetite, iron hydroxides such as goethite and bernalite, and combinations thereof. Preferably, the materials comprise iron oxides that have active sites exposed at the surface to react with gaseous molecules such as $CO_2$. The materials comprising iron oxides can be readily accessible at iron and steel industrial sites, for example, in iron ore mines, reducing the transportation and material handling cost.

In one embodiment, the reaction materials introduced into the carbonation reactor are dry or wet. The reaction materials may be in a form of solid, liquid, or slurry. In a specific embodiment, the port for introducing the materials into the carbonation reactor is located at or near one end of the reactor, preferably, the upper end of the carbonation reactor.

In one embodiment, the stream of gas comprising $CO_2$ is introduced into the carbonation reactor via a second port located at or near the other end of the reactor, preferably, the lower end of the reactor. The stream of gas may be pure $CO_2$. The reactor is flushed several times with $CO_2$ gas to ensure a pure $CO_2$ atmosphere inside the reactor. The stream of gas may also comprise $O_2$, CO and $N_2$. In some embodiments, the stream of gas comprising $CO_2$ may be hot and/or pressurized when introduced into the carbonation reactor. The stream of gas comprising $CO_2$ may also be introduced at room temperature condition.

In one embodiment, the carbonation reactor also comprises a third port for obtaining the reaction product, for example, metal carbonates, preferably, siderite. The carbonates formed in the reactor can be released via the third port located on the opposite end of the first port for introducing the raw materials.

In one embodiment, the system for capturing carbon dioxide also comprises a grinding mechanism inside the carbonation reactor for grinding the reaction materials. In a preferred embodiment, the grinding mechanism comprises grinding balls for grinding the materials to increase the efficiency of the carbonation reaction. The grinding balls can be made of, for example, stainless steel.

In one embodiment, the amount of the grinding balls in the carbonation reactor is selected as to break the largest feed particles of the reaction materials. The weight ratio between feed materials and grinding balls may range from 1:1-20 or 2:1-50. Preferably, the weight ratio between feed materials and grinding balls may be 1:3, 1:4, 1:5, 1:6, 1:7, 1:8, 1:9, 1:10, 1:11, 1:12, 1:13, 1:14, 1:15; 1:16, 1:17, 1:18; 1:19; 1:20, 2:7, 2:9, 2:11, 2:13, 2:15, 2:17, 2:19, 2:21, 2:23, 2:25, 2:27, 2:29, 2:31, 2:33, 2:35, 2:37, or 2:39. More preferably, the weight ratio between feed materials and grinding balls is 2:27.

In one embodiment, the size of the grinding balls ranges from about 0.1 mm to about 100 mm, from about 1 mm to about 90 mm, from about 2 mm to about 80 mm, from about 5 mm to about 60 mm, or from about 10 mm to about 50 mm. As the grinding progresses, the particle diameter of the materials being ground is reduced.

In one embodiment, the system for capturing carbon dioxide may also comprise a revolution arm that makes the carbonation reactor rotatable at certain revolution speeds so that the grinding mechanism inside the carbonation reactor can grind the reaction materials.

In a preferred embodiment, the carbonation reactor is a ball mill such that revolutional centrifugal forces and rotational centrifugal forces generated in a mill pot (e.g., grinding vessel/carbonation reactor) in rotation during its motion are applied to the reaction materials to be ground and grinding balls contained in the carbonation reactor to cause severe collisions between the reaction materials and the grinding balls. The reaction material is grounded by the resulting compression and shearing.

In one embodiment, the system for capturing $CO_2$ utilizes the ball mill rotation through a series of mechano-chemical reactions. The system comprises a reactor comprising a reaction mixture comprising iron oxides and/or iron hydroxides, wherein the reaction mixture reacts with a gaseous stream of $CO_2$. The iron oxide includes magnetite, wustite, and hematite while the iron hydroxide includes goethite and bernalite.

Advantageously, iron oxides have active sites exposed at the surface to react with gaseous molecules such as $CO_2$. Material treated in mechano-chemical ball milling process presents improvements in its features such as surface area and pore volume. Longer time of exposure to ball milling translates to increases of pores sites refreshing the available material to react.

The materials comprising iron oxides can be readily accessible at iron and steel industrial sites, for example, in iron ore mines, reducing the transportation and material handling cost.

In specific embodiments, the materials are samples of iron ore taken from the iron mine. Such raw materials comprise impurities such as $SiO_2$, CaO, $Al_2O_3$, MgO, MnO, $P_2O_5$, $Na_2O$, $K_2O$, S and ZnO. Among these impurities, sulfur in elemental form or as metal sulfide can act as reducing agents, providing advantages for carbonating the iron ore. Pre-treatments are not necessary for the iron oxides because they can be taken from the mines directly and be used in $CO_2$ capture.

In one embodiment, the reaction mixture also comprises a reducing agent. Preferably, the reducing agent is selected from carbon (graphite) and metallic iron. Carbon and metallic iron are used due to their thermodynamic properties and high availability. Moreover, metallic iron can be a good reducing agent because it is produced at a site where carbon dioxide capture takes place, e.g., steel mill. Carbon is a preferred reducing agent because it is cheaper than metallic irons.

In one embodiment, the reducing agent is added in the reaction mixture at a concentration within the range from 0 mol % to 40 mol %, from 0 mol % to 30 mol %, from 0 mol % to 20 mol %, preferably, 0 mol % to 10 mol %, more preferably, 3 mol % to 5 mol %. In specific embodiments, the reducing agent is added at 1 mol %, 3 mol %, 5 mol % or 10 mol %.

In a specific embodiment, iron oxides such as magnetite and hematite, and reducing agents such as iron and carbon are mixed in the reaction mixture in a molar ratio of, for example, 1:1 or 2:1.

In one embodiment, the subject invention provides systems for synthesizing siderite from materials comprising metal oxides and $CO_2$ using mill rotation through a series of mechano-chemical reactions. The systems also simultaneously sequestrate $CO_2$, for example, in the form of siderite.

In one embodiment, the system for capturing carbon dioxide, comprises a carbonation reactor comprising a mixture of reaction materials comprising i) magnetite and iron, ii) hematite and iron, iii) magnetite and carbon, iv) wustite, or v) hematite and goethite; a first port for receiving the mixture of reaction materials; a second port for receiving a stream of gaseous carbon dioxide; and a grinding mechanism comprising grinding balls inside the carbonation reactor for grinding the reaction materials, the reaction materials reacting with carbon dioxide to form siderite; and a calcination reactor comprising a first port for receiving siderite produced in the carbonation reactor, the calcination reactor decomposing siderite to reproduce magnetite or hematite, the reproduced magnetite or hematite being recycled back to the carbonation reactor via the first port for receiving the mixture of reaction materials.

In one embodiment, the subject invention utilizes iron oxides to capture $CO_2$ and produce iron carbonates, e.g., in equations [1], [2], [3], [4] and [5].

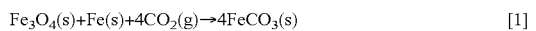
$$Fe_3O_4(s)+Fe(s)+4CO_2(g)\rightarrow 4FeCO_3(s) \qquad [1]$$

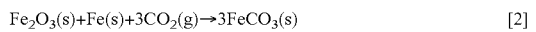
$$Fe_2O_3(s)+Fe(s)+3CO_2(g)\rightarrow 3FeCO_3(s) \qquad [2]$$

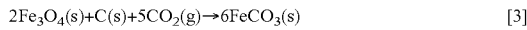
$$2Fe_3O_4(s)+C(s)+5CO_2(g)\rightarrow 6FeCO_3(s) \qquad [3]$$

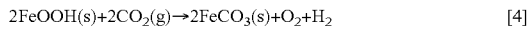
$$2FeOOH(s)+2CO_2(g)\rightarrow 2FeCO_3(s)+O_2+H_2 \qquad [4]$$

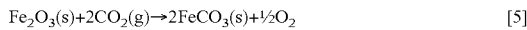
$$Fe_2O_3(s)+2CO_2(g)\rightarrow 2FeCO_3(s)+\tfrac{1}{2}O_2 \qquad [5]$$

$CO_2$ capture capacity of material may be affected by temperature, pressure, revolution speed and reaction time. Siderite formation is favoured either by high pressures at a constant temperature or by low temperatures at a constant pressure. The temperature inside the carbonation reactor may range from about 20 to about 1000° C., from about 20 to about 900° C., from about 20 to about 800° C., from about 20 to about 700° C., from about 20 to about 600° C., from about 20 to about 500° C., from about 20 to about 400° C., from about 20 to about 300° C., from about 20 to about 200° C., from about 20 to about 100° C., from about 20 to about 50° C., from about 20 to about 40° C., or from about 20 to about 30° C. Carbonation is a highly exothermic process at mechano-chemical ball mill conditions. Thus, carbonation is thermodynamically favourable during ball milling process at room temperature.

In one embodiment, the $CO_2$ pressure inside the carbonation reactor may range from about 0 to about 200 bar, from about 0 to about 190 bar, from about 0 to about 180 bar, from about 0 to about 170 bar, from about 0 to about 160 bar, from about 0 to about 150 bar, from about 0 to about 140 bar, from about 0 to about 130 bar, from about 0 to about 120 bar, from about 0 to about 110 bar, from about 0 to about 100 bar, from about 0 to about 90 bar, from about 0 to about 80 bar, from about 0 to about 70 bar, from about 0 to about 60 bar, from about 0 to about 50 bar, from about 0 to about 40 bar, from about 0 to about 30 bar, from about 0 to about 20 bar, from about 0 to about 10 bar, or from about 0 to about 5 bar. In a preferred embodiment, the CO2 pressure in the carbonation reactor is 10, 20 or 30 bar.

In one embodiment, the siderite production increases with the increase of $CO_2$ pressure and reaction time. The reaction time for synthesizing siderite lasts at least 10 min, 20 min, 30 min, 40 min, 50 min, 60 min, 70 min, 80 min, 90 min, 100 min, 110 min, 120 min, 3 hours, 4 hours, 5 hours, 6 hours, 7 hours, 8 hours, 9 hours, 10 hours, 15 hours, 20 hours, 24 hours, 36 hours, 48 hours, 60 hours, or 72 hours. For example, at 30 bar $CO_2$ pressure, siderite yield can reach about 75% in 120 minutes.

In one embodiment, the revolution speed ranges from about 100 rpm to 5000 rpm, from about 100 rpm to 4000 rpm, from about 100 rpm to 3000 rpm, from about 100 rpm to 2000 rpm, from about 100 rpm to 1500 rpm, from about 100 rpm to 1000 rpm, from about 100 rpm to 800 rpm, from about 100 rpm to 500 rpm, or from about 200 rpm to 400 rpm. In a preferred embodiment, the revolution speed is 200 rpm or 400 rpm. The $CO_2$ capture by the sorbent increases at higher pressures, faster revolution speed and longer reaction times at the same temperature.

If the number of revolutions is lower, the siderite formation decreases. Increases in revolution speed transfer higher kinetic energy to the materials, thereby promoting the formation of crystal defects such as stacking faults, dislocations, vacancies, and increased number of grain boundaries. The presence of these defects generates more active sites in magnetite, hematite and iron, which facilitate their reaction with $CO_2$.

In one embodiment, the system may further comprise a sonication unit that provides ultrasound waves for intensification of carbonation reactions. The sonication unit comprises one or more ultrasonic transducers providing ultrasound waves having frequencies in the range of kHz, for example, from about 1 kHz to about 1000 kHz, from about 1 kHz to about 900 kHz, from about 1 kHz to about 800 kHz, from about 1 kHz to about 700 kHz, from about 1 kHz to about 600 kHz, from about 1 kHz to about 500 kHz, from about 1 kHz to about 400 kHz, from about 1 kHz to about 300 kHz, from about 1 kHz to about 200 kHz or from about 1 kHz to about 100 kHz. Preferably, the sonication frequency ranges from 15 kHz to 100 kHz. The reactor may comprise at least one, two, three, four, five, six, seven, eight, nine or ten ultrasonic transducers attached to the wall of the reactor in order to provide ultrasound waves.

Such ultrasound waves induce turbulence and circulation, which enhances heat transfer, improves convection, makes thinner diffusion-limiting boundary layers. As a consequence, high temperatures, pressures and cut forces are generated. Advantageously, the system and method uses ultrasound waves to promote mass transfer, diffusion conditions, precipitation and growthing of crystals.

The carbonation reaction can be enhanced by using small particles with larger surface area. The large surface area increases the hydration and dissolution rates of the iron oxides allowing more carbon dioxide to react immediately without need to diffuse through the solid layer of reaction products. Sonication action reduces the particle size and increases surface area.

In one embodiment, water is also introduced in the carbonation reactor in the reaction mixture as carbonation is favored in wet slurries. For example, the addition of water in reaction [1] can improve the reaction kinetics. Water can also act as the medium, allowing efficient interaction between the ultrasonic wave and the sorbent. These effects cause solid surface erosion, leading to the removal of passivating layers or to the eventual breakage of particles. The reaction efficiency can be achieved by selecting the suitable ratio between sorbent and water. The suitable sorbent to water weight ratio could range, for example, from 1:0.01 to 1:100, from 1:0.1 to 1:50, from 1:0.1 to 1:20 or from 1:0.1 to 1:10. Preferrably, the suitable sorbent to water weight ratio is 1:0.2.

In some embodiments, the reactor may comprise means for separating siderite from the reaction mixture. Such separation may envolve using a magnetic separator for separating siderite from the reaction mixture. In other embodiments, the system further comprises a pump connected to the carbonation and/or calcination reactor. The pump may be a component of the reactor that control the flow, pressure, and/or temperature of the reactor.

Iron carbonates such as siderite can act as an efficient reversible sorbent. Formed siderite can then be decomposed, generating magnetite, carbon and/or metallic iron as well as pure carbon dioxide, which can be used in other applications. For example, the generated pure $CO_2$ gas can be sequestered underground, sold or used for oil gas recovery. In a specific embodiment, decarbonation occurs at relatively low temperatures (about 180° C. at 1 atm pressure).

In one embodiment, the system further comprises a calcination reactor comprising a first port for receiving iron carbonates such as siderite, wherein siderite is decomposed in the calcination reactor to regenerate pure $CO_2$, magnetite or hematite, a second port for collecting magnetite or hematite to be reused in the carbonation reactor, and a third port for collecting $CO_2$.

In a preferred embodiment, decomposition of siderite and generating carbon dioxide occur at room temperature conditions.

In one embodiment, the carbonates can regenerate back the oxides for using in the next cycle for capturing $CO_2$, e.g., in equations [6] and [7].

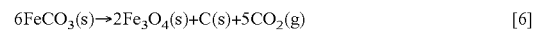

$$6FeCO_3(s) \rightarrow 2Fe_3O_4(s) + C(s) + 5CO_2(g) \qquad [6]$$

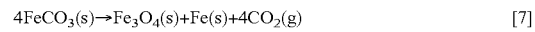

$$4FeCO_3(s) \rightarrow Fe_3O_4(s) + Fe(s) + 4CO_2(g) \qquad [7]$$

Formed siderite is decomposed, generating pure carbon dioxide which can be sold for different processes, for instance, in food industry or oil recovery. Equations [6] and [7] show the iron oxides regeneration in inert atmosphere or vacuum, producing carbon and metallic iron which can act as reducing agents in a subsequent carbonation reaction. Thus, the initial materials in the reaction mixture can be used for multiple cycles according to the combination of [1], [2], [3], [4], [5], [6] and [7] reactions, as in FIG. 1.

In the presence of oxygen, $FeCO_3$ oxidation takes place as in equations [8] and [9]:

$$3FeCO_3 + \tfrac{1}{2}O_2 \rightarrow Fe_3O_4 + 3CO_2 \qquad (8)$$

$$4FeCO_3 + O_2 \rightarrow 2Fe_2O_3 + 4CO_2 \qquad (9)$$

In some embodiments, the calcination reactor may comprise means for separating carbon and metallic iron from magnetite.

In some embodiments, multiple carbonation-calcination cycles (e.g., at least 2, 3, 4, 5, 6, 7, 8, 9, 10, 11, 12, 13, 14, 15, 16, 17, 18, 19, or 20) occur in the system for capturing $CO_2$. Advantageously, the iron-based raw materials for the $CO_2$ capture process utilized for a large number of carbonation and calcination cycles make them attractive sorbents for iron mills. Such raw material does not lose the capture capacity. Instead, the capture capacity increases with the number of carbonation-calcination cycles, which significantly reduces the amount of needed materials and transportation cost.

Even if the sorbent capacity of the raw material degrades, the raw material can be used in further processing, for example, in a blast furnace for the production of iron or steel. Thus, the systems and methods according to the subject invention can significantly reduce or even eliminate loss of raw materials, and are more thermodynamically favorable and thus can save energy.

In one embodiment, siderite decomposition occurs in the argon atmosphere, in the air atmosphere or in vacuum. The temperature for siderite decomposition may range from about 20 to about 1000° C., from about 20 to about 900° C., from about 20 to about 800° C., from about 20 to about 700° C., from about 20 to about 600° C., from about 20 to about 500° C., from about 20 to about 400° C., from about 20 to about 300° C., from about 20 to about 200° C., from about 20 to about 100° C., from about 20 to about 50° C., from about 20 to about 40° C., or from about 20 to about 30° C. In a preferred embodiment, the siderite decomposition temperature is 20° C.

In a specific embodiment, an endothermic peak at 367° C. is assigned to the siderite decomposition in the argon atmosphere while an endothermic peak at 407° C. is identified as temperature of siderite decomposition in the air atmosphere.

In one embodiment, the pressure for siderite decomposition may range from about 0 to about 200 bar, from about 0 to about 150 bar, from about 0 to about 100 bar, from about 0 to about 50 bar, from about 0 to about 20 bar, from about 0 to about 10 bar, from about 0 to about 5 bar, or from about 0 to about 2 bar. For example, the pressure may be about 1, 10, 20 or 30 bar. In a preferred embodiment, the pressure is 1.019 bar.

In one embodiment, the reaction time for siderite decomposition lasts at least 10 min, 20 min, 30 min, 40 min, 50 min, 60 min, 70 min, 80 min, 90 min, 100 min, 110 min, 120 min, 3 hours, 4 hours, 5 hours, 6 hours, 7 hours, 8 hours, 9 hours, 10 hours, 15 hours, 20 hours, 24 hours, 36 hours, 48 hours, 60 hours, 72 hours, or 84 hours.

Siderite stability depends strongly on water amount in the mixture. The water amount in the reaction ranges from 0 mol to 50 mol, from 0 mol to 40 mol, from 0 mol to 30 mol, from 0 mol to 20 mol, from 0 mol to 10 mol, from 1 mol to 20 mol, from 5 mol to 20 mol, or from 10 mol to 20 mol. Equilibrium temperature decreases by increasing water amount, so that the regeneration of material is possible at relatively low temperatures, showing values of siderite decomposition temperature even lower than 100° C. when the amount of water included is 15 mol.

In one embodiment, the subject invention provides a method for capturing $CO_2$ employing mechano-chemical reactions using the system according to the subject invention. The method comprises passing a stream of gas comprising $CO_2$ through the system according to the subject invention and capturing $CO_2$ by forming carbonates.

In one embodiment, the subject invention provides a method for synthesizing siderite, the method comprising passing a stream of gas comprising $CO_2$ through the system according to the subject invention, forming siderite and optionally, separating siderite from the carbonation reactor.

In one embodiment, the subject invention provides a method for capturing $CO_2$ comprising introducing a mixture of reaction materials comprising metal oxides into a carbonation reactor, the carbonation reactor comprising a grinding mechanism for grinding the reaction materials; and passing a stream of gas comprising $CO_2$ into the carbonation reactor to react with the mixture of reaction materials and form metal carbonates.

In one embodiment, the method for capturing $CO_2$ further comprises steps of separating the metal carbonates from the reaction mixture in the carbonation reactor; decomposing the metal carbonates to produce reusable metal oxides and pure $CO_2$; and introducing the reproduced metal oxides into the carbonation reactor as the reaction materials. The metal carbonates may be introduced into a calcination reactor for the decomposition.

In one embodiment, the subject invention provides a method for capturing $CO_2$ comprising a plurality of carbonation and calcination cycles, each carbonation and calcination cycle comprising steps of:

introducing a mixture of reaction materials comprising metal oxides into a carbonation reactor, the carbonation reactor comprising a grinding mechanism for grinding the reaction materials;

passing a stream of gas comprising $CO_2$ into the carbonation reactor to reach a $CO_2$ pressure, wherein $CO_2$ can react with the mixture of reaction materials and form metal carbonates; and optionally, decomposing the metal carbonates to produce metal oxides and pure $CO_2$, wherein the reproduced metal oxides can be introduced into the carbonation reactor as the reaction materials.

In one embodiment, the reaction materials introduced into the carbonation reactor are dry or wet. The reaction materials many be in a form of solid, liquid, or slurry. The grinding mechanism comprises grinding balls for grinding the reaction materials to increase the efficiency of the carbonation reaction. The grinding balls may be made of, for example, stainless steel.

In one embodiment, the method for capturing $CO_2$ comprises a step of milling the mixture of reaction materials by applying a revolution speed that rotates the carbonation reactor so that the grinding mechanism inside the carbonation reactor provides mechanical force to grind the reaction materials while $CO_2$ reacts with the reaction materials to form metal carbonates. The revolution speed ranges from about 100 rpm to 5000 rpm, from about 100 rpm to 4000 rpm, from about 100 rpm to 3000 rpm, from about 100 rpm to 2000 rpm, from about 100 rpm to 1500 rpm, from about 100 rpm to 1000 rpm, from about 100 rpm to 800 rpm, from about 100 rpm to 500 rpm, or from about 200 rpm to 400 rpm. In a preferred embodiment, the revolution speed is 200 rpm or 400 rpm.

In one embodiment, $CO_2$ introduced into the carbonation reactor reaches a $CO_2$ pressure inside the carbonation reactor ranging from about 0 to about 500 bar, from about 0 to about 400 bar, from about 0 to about 300 bar, from about 0 to about 200 bar, from about 0 to about 100 bar, from about 0 to about 90 bar, from about 0 to about 80 bar, from about 0 to about 70 bar, from about 0 to about 60 bar, from about 0 to about 50 bar, from about 0 to about 40 bar, from about 0 to about 30 bar, from about 0 to about 20 bar, from about 0 to about 10 bar, or from about 0 to about 5 bar. In a preferred embodiment, the $CO_2$ pressure in the carbonation reactor is 10, 20 or 30 bar.

In one embodiment, the method may also comprise a step of applying at least one pulse of a ultrasound wave for inducing turbulence and circulation of reaction materials and grinding mechanism in the carbonation reactor. The ultrasound wave may be applied by a sonication unit that comprises one or more ultrasonic transducers placed near or on the wall of the carbonation reactor. The ultrasound wave has a frequency in the range of kHz, for example, from about 1 kHz to about 1000 kHz. The preferred range for sonication is from 15 kHz to 100 kHz. The carbonation reactor may comprise at least one, two, three, four, five, six, seven, eight, nine or ten ultrasonic transducers for providing ultrasound waves. The sonication step reduces the particle size of the reaction materials and increases surface area of the reaction materials available to react with carbon dioxide.

In one embodiment, the ultrasound pulses last at least 10 seconds, 30 seconds, 60 seconds, 90 seconds, 120 seconds, 150 seconds, 180 seconds, 240 seconds, 300 seconds, 10 minutes, 20 minutes, 30 minutes, 60 minutes, 120 minutes, 180 minutes, 240 minutes, 300 minutes, 10 hours, 15 hours, 24 hours, 36 hours, 48 hours, 72 hours, 96 hours, 120 hours, 144 hours, 168 hours, 192 hours, or 216 hours.

In one embodiment, the method for capturing $CO_2$ also comprises a step of separating the metal carbonates from the reaction mixture prior to the step of decomposition, wherein the separation of metal carbonates employs a magnetic separator, e.g., a magnet.

In one embodiment, the method for capturing $CO_2$ may comprise steps for decomposing metal carbonates, said steps include introducing metal carbonates into a calcination reactor, and decomposing metal carbonates to metal oxides and pure $CO_2$.

In one embodiment, the method for capturing $CO_2$ may further comprise a step of introducing an effective amount of a reducing agent into the carbonation reactor prior to each carbonation and calcination cycle.

In one embodiment, the method can further comprise a step of cooling the carbonation reactor prior to the decomposition step to avoid overheating the reaction samples in the carbonation reactor, and/or a step of cooling the carbonation and/or calcination reactor prior to the subsequent cycle to avoid overheating the reaction samples in the reactor. In a further embodiment, the cooling step may last at least 10, 20, 30, 40, 50, or 60 min. In certain embodiments, the cooling step occurs at least every 1, 2, 3, 4, 5, 10, 15, 20, 24, 36 or 48 hours of the mechano-chemical reaction in the carbonation and calcination cycle. In a preferred embodiment, the cooling step occurs for half an hour following every 1 hour mechano-chemical reaction. In a specific embodiment, the cooling step cools the temperature of the reactor to room temperature.

In one embodiment, the plurality of carbonation and calcination cycles includes at least two, three, four, five, six, seven, eight, nine, ten, eleven, twelve, thirteen, fourteen, fifteen, sixteen, seventeen, eighteen, nineteen or twenty carbonation and calcination cycles.

In one embodiment, the subject invention provides a method for capturing $CO_2$ comprising a plurality of carbonation and calcination cycles, each carbonation and calcination cycle comprising steps of:

introducing a mixture of reaction materials comprising i) magnetite and iron, ii) hematite and iron, iii) magnetite and carbon, iv) wustite, or v) hematite and goethite into a carbonation reactor, the carbonation reactor comprising a grinding mechanism for grinding the reaction materials;

passing a stream of gas comprising $CO_2$ into the carbonation reactor;

applying a revolution speed that rotates the carbonation reactor so that the grinding mechanism inside the carbonation reactor grinds the reaction materials while $CO_2$ reacts with the reaction materials to form siderite; and optionally, decomposing siderite to produce $CO_2$ and one or more of magnetite, hematite, wustite, and goethite, wherein the reproduced one or more of magnetite, hematite, wustite, and goethite can be introduced into the carbonation reactor as the reaction materials.

In one embodiment, the method for capturing $CO_2$ comprises 1) introducing a mixture of reaction materials comprising i) magnetite and iron, ii) hematite and iron, iii) magnetite and carbon, iv) wustite, or v) hematite and goethite into a carbonation reactor;

2) passing a stream of gas comprising $CO_2$ into the carbonation reactor;

3) applying a revolution speed that rotates the carbonation reactor so that the grinding mechanism inside the carbonation reactor grinds the reaction materials while $CO_2$ reacts with the reaction materials to form siderite;

4) optionally, separating siderite from the carbonation reactor;

5) optionally, introducing siderite into a calcination reactor for decomposition to reproduce $CO_2$ and one or more of magnetite and hematite; and 6) optionally, introducing reproduced one or more of magnetite and hematite into the carbonation reactor as the reaction materials.

In one embodiment, the method for capturing $CO_2$ may require repeating the steps 1)-6) for at least two, three, four, five, six, seven, eight, nine or ten times.

In one embodiment, the carbonation reactor comprises a first port for receiving the reaction materials, a second port for receiving a stream of gas comprising $CO_2$, and a third port for obtaining the reaction product, e.g., siderite.

In one embodiment, the carbonation reactor also comprises a grinding mechanism inside said reactor for grinding the reaction materials. In a preferred embodiment, the grinding mechanism comprises grinding balls for grinding the reaction materials to increase the efficiency of the reaction.

In one embodiment, the method also comprises a step of introducing a reducing agent into the carbonation reactor, for example, through the first port for introducing the reaction materials or a separate port. Preferably, the reducing agent is selected from carbon and metallic iron. Carbon and metallic iron are used due to their thermodynamic properties and high availability.

In one embodiment, the method may also comprise a step of introducing water into the carbonation and/or calcination reactor. The water amount in the reaction mixture may range from 0 mol to 50 mol, from 0 mol to 40 mol, from 0 mol to 30 mol, from 0 mol to 20 mol, from 0 mol to 10 mol, from 1 mol to 20 mol, from 5 mol to 20 mol, or from 10 mol to 20 mol. In a specific embodiment, the weight ratio of water and the reaction material, e.g., iron oxides may be, for example, 1:1.

In one embodiment, the method further comprises a step of milling the reaction mixture comprising reaction materials and, optionally, the reducing agent by the grinding mechanism inside the reactor.

In one embodiment, the method further comprises a step of cooling the carbonation and/or calcination reactor for, for example, about half an hour following every 1 hour mechano-chemical reaction to avoid overheating the reaction samples in the reactor.

In one embodiment, the reaction materials such as magnetite and hematite can act as an efficient reversible sorbent of carbon dioxide for multiple carbonation-calcination cycles due to increases in the surface area with the increased number of cycles during the mechano-chemical treatment.

High levels of siderite yield are accomplished by the mechano-chemical method using iron oxides. Predominantly pure siderite can be obtained due to the highly favorable thermodynamic conditions, unlike other methods where reverse reactions frequently occur.

The mechano-chemical method for $CO_2$ capture using iron oxides improves the sorption features of material with each capture carbonation-calcination cycle. The surface area is increased with the exposure time of material inside mechanical ball milled. The surface area of the material used in several carbonation-calcination cycles is larger than that of the material as received. Pore volume is also increased with exposure time to milling. This converts the material into an efficient sorbent that can work in multiple cycles and that can be integrated in different industrial processes, such as the cement industry, steel production (ideal site to implement it due to high availability of raw materials), power generation industry etc.

In one embodiment, the subject invention also provides a method for decomposing siderite for producing pure $CO_2$ and magnetite using the reactor according to the subject invention. Unlike other methods, here the same material can be used for multiple calcination reactions producing large amounts of pure $CO_2$ in each reaction because siderite predominates in carbonated samples after the carbonation reactions. Produced pure $CO_2$ may be sold for various industrial processes.

The yield of iron and carbon as reducing agents in each calcination reaction allows the reduction in the extra-cost in next carbonation. Lower cost in material transportation, handling and operation can be achieved because the initial materials can be used indefinitely in several industrial processes, while reducing agents are being yielded by calcinations.

This method provides an important profit in expense of energy because the calcination can be performed at room temperature conditions when the iron oxides are carbonated including a suitable amount of water.

As used herein, the singular forms "a," "an" and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." The transitional terms/phrases (and any grammatical variations thereof) "comprising," "comprises," "comprise," "consisting essentially of," "consists essentially of," "consisting" and "consists" can be used interchangeably.

The term "about" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 0-20%, 0 to 10%, 0 to 5%, or up to 1% of a given value. Alternatively, particularly with respect to biological systems or processes, the term can mean within an order of magnitude, preferably within 5-fold, and more preferably within 2-fold, of a value. Where particular values are described in the application and claims, unless otherwise stated the term "about" meaning within an acceptable error range for the particular value should be assumed. In the context of compositions containing amounts of ingredients where the term "about" is used, these compositions contain the stated amount of the ingredient with a variation (error range) of 0-10% around the value (X±10%).

EXAMPLES

Experimental Section

Mechanochemical reactions between magnetite or hematite and carbon dioxide were performed at room temperature and elevated $CO_2$ pressure (10-30 bar). Planetary ball mill Retsch PM100 was operated at 200-400 revolutions per minute. Vessel for the ball milling was a stainless-steel jar of 50 mL volume capable for holding up to 100 bar gas pressure. High purity $CO_2$ gas (Airgas, 99.999%) was loaded into the reactor at different pressures together with 3.00 g of magnetite (Alfa Aesar, nanopowder, 97%) or hematite (99.945%) and iron (Good Fellow, 99% purity, <60 μm) mixture in a molar ratio 1:1. The powder to balls (stainless steel) weight ratio was 2:27. Reactor was flushed several times with $CO_2$ gas to ensure a pure $CO_2$ atmosphere inside the reactor. Mechanochemical reaction was run for different periods of time from 30 min up to 36 h. Each 1 h milling interval was followed by half an hour cooling interval to avoid overheating of the sample.

Thermogravimetric analysis (TGA) and differential scanning calorimetry (DSC) were conducted in a temperature range of 25° C.-1000° C. using TA Instruments SDT Q600 instrument. The measurements were performed in air and Ar atmospheres with a heating rate of 10° C./min. Powder X-ray diffraction patterns were collected using Bruker GADDS/D8 diffractometer equipped with Apex Smart CCD Detector and molybdenum rotating anode. Collected 2D diffraction patterns were integrated using Fit2D software. Quantitative phase analysis of the samples was performed using Rietveld method and GSAS package. The $CO_2$ sorption capacity was calculated using the results generated by Rietveld refinement of XRD patterns. Scanning electron microscope (JEOL JSM-6330F) was used to study the morphology of powder particles. Surface area of the powders was measured using Brunauer-Emmett-Teller (BET) method and Micromeritics Tristar II 3020 instrument.

A continuous wave (CW) argon ion (Ar+) laser (model 177G02, Spectra Physics) of 514.4 nm in wavelength was used as a source of monochromatic radiation. Backscattered Raman spectra were collected by a high-throughput holographic imaging spectrograph (model HoloSpec f/1.8i, Kaiser Optical Systems) with volume transmission gratings, a holographic notch filter, and thermoelectrically cooled charge-coupled device (CCD) detector (Andor Technology). The Raman system has spectral resolution of 4 $cm^{-1}$. The spectra were usually collected with 10 minutes of exposure.

Figure 3:
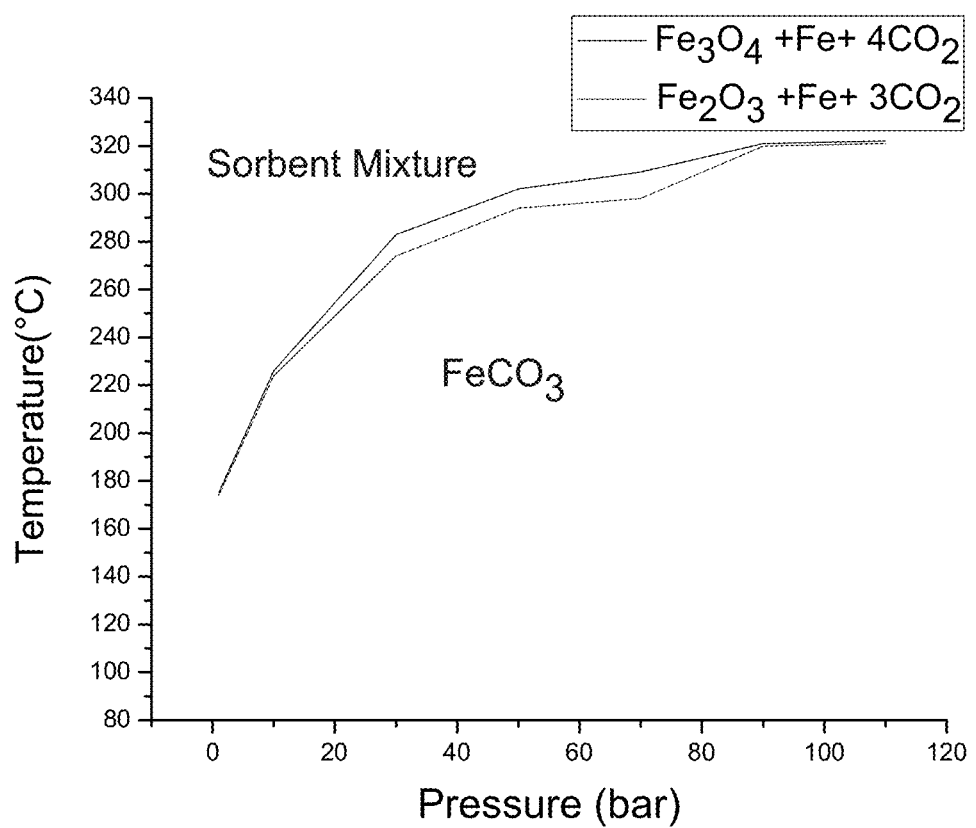
FIG. 3 shows the equilibrium temperature of siderite decomposition as a function of pressure for the $Fe_3O_4$—Fe—$CO_2$ and $Fe_2O_3$—Fe—$CO_2$ systems $Fe_3O_4+Fe+4CO_2 \rightarrow 4FeCO3$ and $Fe_2O_3+Fe+3CO_2 \rightarrow 4FeCO_3$.

Example 1—Thermodynamic Simulation of $Fe_3O_4$—Fe—$CO_2$ and $Fe_2O_3$—Fe—$CO_2$ Systems FACTSAGE software and the databases therein, FACT-F*A*C*T 5.0, SGPS-SGTE and SGSL were used to verify the thermodynamic feasibility of carbonation process for the systems $Fe_3O_4$—Fe—$CO_2$ and $Fe_2O_3$—Fe—$CO_2$. FIG. 3 shows the calculated equilibrium temperature as a function of pressure (phase diagram) in both systems. These results indicate that the siderite formation is favored either by high pressures at a constant temperature or by low temperatures at a constant pressure. Both systems have similar behavior. The $Fe_2O_3$—Fe—$CO_2$ system shows slightly lower equilibrium temperatures at the same pressure. This calculation indicates that carbonation is thermodynamically favorable during ball milling process at room temperature and decarbonation is possible at relatively low temperatures (about 180° C. at 1 atm pressure).

Example 2—Carbon Dioxide Capture Through Siderite Formation from Magnetite/Hematite and Iron 3 g of magnetite/hematite were used with iron according the stoichiometry presented in reactions [1] and [2]. Mechano-chemical reactions were performed at 30 bar $CO_2$ pressure and 400 rpm planetary ball mill revolution speed.

Figure 4:
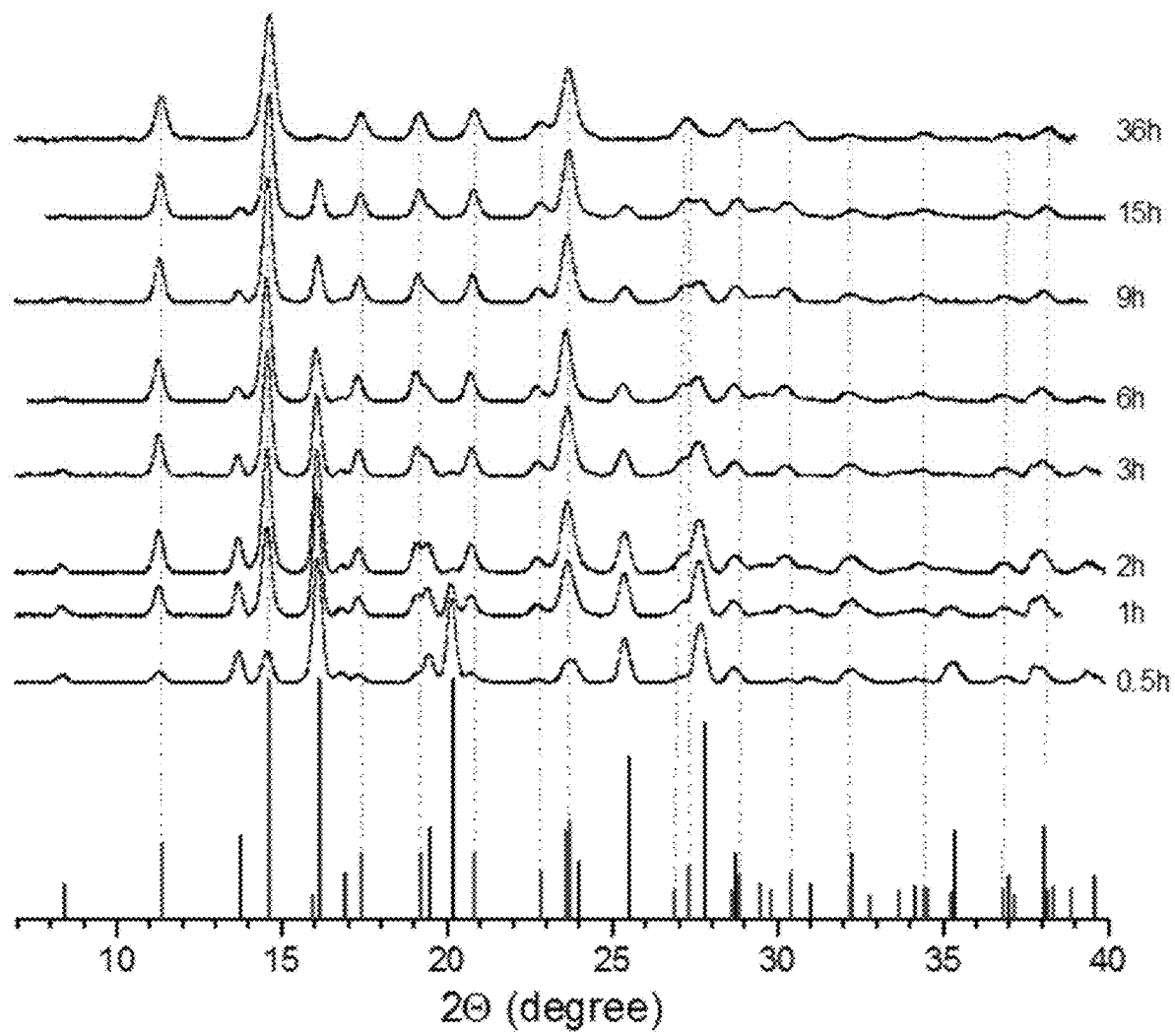
FIG. 4 presents the evolution of X-ray diffraction patterns ($\lambda$=0.71073 Å) of $Fe_3O_4$+Fe mixture at 30 bar $CO_2$ pressure with a time of ball milling (400 rpm). Plot at the bottom shows XRD patterns of Fe (JCPDS #006-0696; black), $Fe_3O_4$ (JCPDS #001-1111; blue) and $FeCO_3$ (JCPDS #029-0696; red). Red dotted lines show positions of the diffraction peaks of siderite.

FIG. 4 shows kinetics of iron(II) carbonate formation in reaction [1]. Weak diffraction peaks of $FeCO_3$ are detected after 30 min milling interval and their intensities increase with milling time. Diffraction peaks of elemental iron vanish after 2 h of milling while $Fe_3O_4$ phase persists for 15 h of the reaction. Disappearance of Fe diffraction peaks but not those of magnetite in XRD patterns could be an indication of elemental iron amorphization on early stage of ball milling. The 36 h sample reveals the presence of siderite as a major phase and small amount of magnetite.

Theoretical $CO_2$ absorption capacity of $Fe_3O_4$—Fe mixture in 1:1 molar ration is 0.6126 g $CO_2$/g sorbent. Rietveld refinement of XRD pattern of 36 h sample yields siderite content 99.76% which is equivalent to 0.6101 g $CO_2$/g sorbent capacity. $CO_2$ absorption capacity which was calculated from TG experiment is 0.5213 g $CO_2$/g sorbent. The difference is associated with small oxidation that occurs in TG when the regenerated oxides come into contact with $CO_2$ when it is released.

It is known that synthetic siderite crystallizes in hexagonal space group R-3c have lattice parameters a=b=4.6919(8) Å and c=15.407(2) Å. Calculated lattice parameters of siderite in the subject invention are a=b=4.679(3) Å and c=15.281(7) Å, which agree with reported values.

Broadening of diffraction peaks of siderite during milling indicates the reduction in crystallite sizes. Average crystallite size of $FeCO_3$ in 36 h sample estimated using Scherrer's formula is 82 Å.

Figure 5:
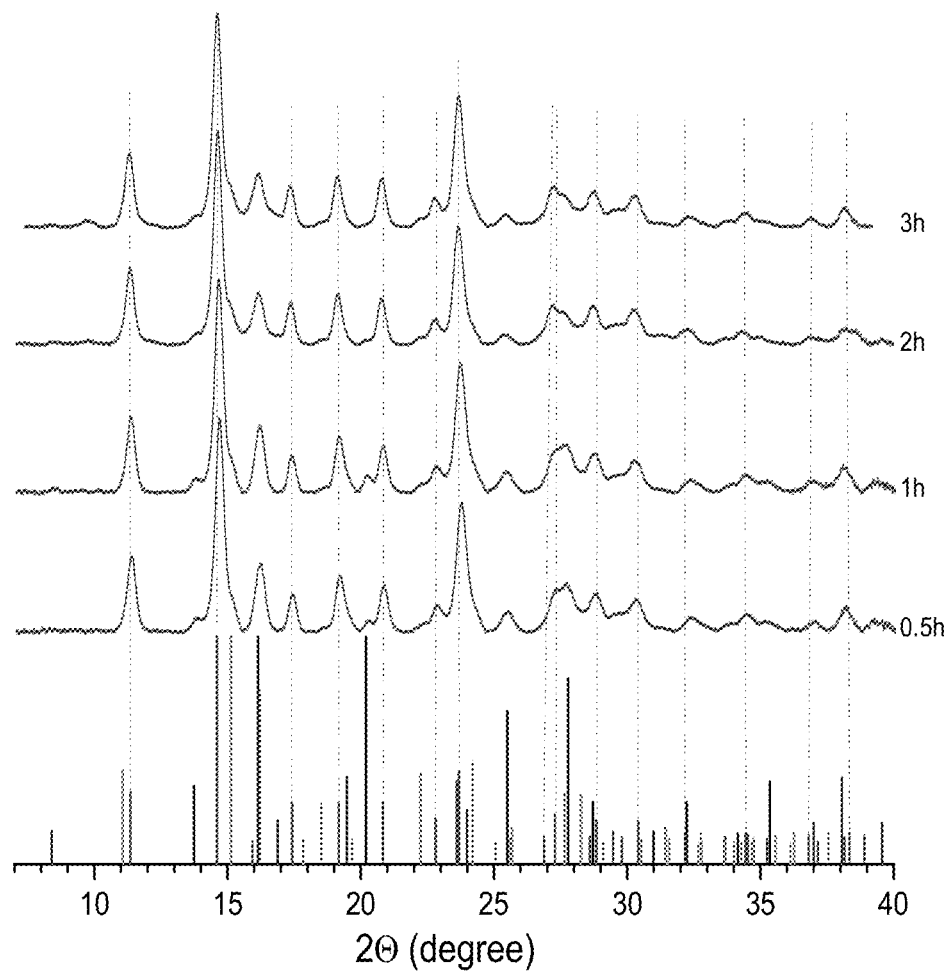
FIG. 5 presents the evolution of XRD patterns ($\lambda$=0.71073 Å) of $Fe_2O_3$+Fe mixture during ball milling (400 rpm) at 30 bar $CO_2$ pressure. Plot at the bottom shows XRD patterns of Fe (JCPDS #006-0696; black), $Fe_2O_3$ (JCPDS #089-2810; green), $Fe_3O_4$ (JCPDS #001-1111; blue) and $FeCO_3$ (JCPDS #029-0696; red). Red dotted lines show positions of the diffraction peaks of siderite.

FIG. 5 shows the evolution in the $Fe_2O_3$—Fe—$CO_2$ system during ball milling at 30 bar $CO_2$ pressure, 400 rpm and 0.5-3 h of reaction time. Formation of siderite in this system proceeds through $Fe_3O_4$ as an intermediate phase because, in mechanical ball milling process, hematite quickly converts to magnetite.

Figure 6:
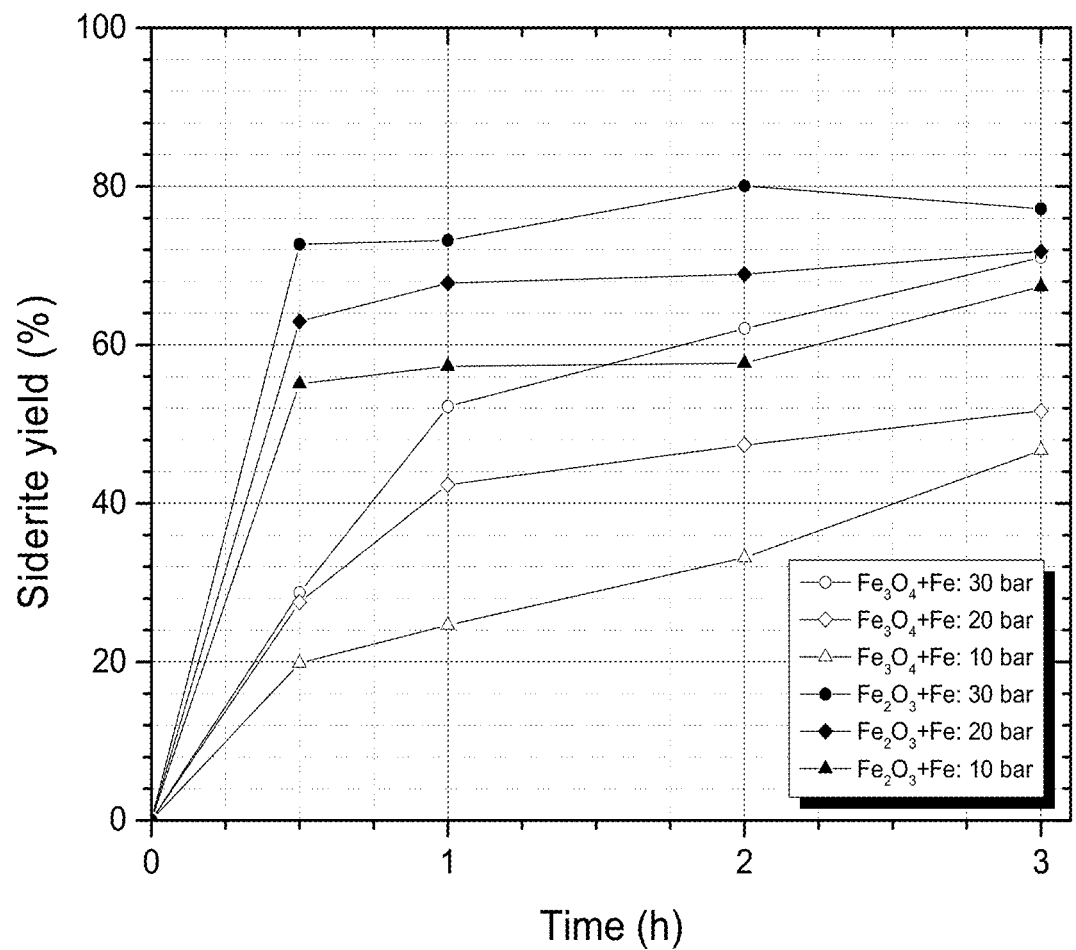
FIG. 6 shows siderite yield as a function of reaction time at 400 rpm for 30, 20 and 10 bars of $CO_2$ pressure in the $Fe_3O_4$—Fe—$CO_2$ and $Fe_2O_3$—Fe—$CO_2$ systems.

Example 3—Effects of $CO_2$ Pressure, Revolution Speed, and Reaction Time on Siderite Formation FIG. 6 depicts siderite yield at different $CO_2$ pressures as a function of reaction time for two systems. Iron (II) carbonate yield increases with $CO_2$ pressure and reaction time. Porous solid materials have interconnected pathways where gas molecules collide between them or with the pore walls. If the $CO_2$ gas pressure is high, the molecules can remain within each available pore of magnetite, hematite or iron forming $FeCO_3$. On the other hand, if the pressure is low, collisions between the $CO_2$ molecule and pore walls are dominant and the free path is restricted with the geometry of void space. Initially, the $CO_2$ capture kinetics is faster in hematite system and at longer times, the siderite yield trends to stabilize, because of inverse reaction occurs at those conditions.

Figure 7A:
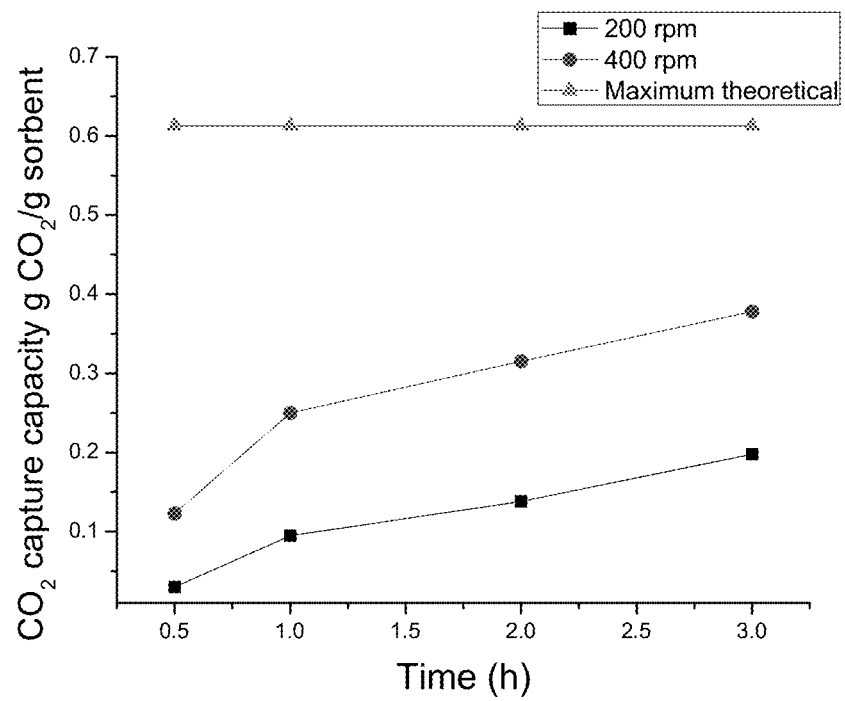
FIGS. 7A-7B depict the $CO_2$ capture capacity as a function of reaction time for 200 and 400 rpm at 30 bar in $Fe_3O_4$—Fe—$CO_2$ (7A) and $Fe_2O_3$—Fe—$CO_2$ (7B) systems.
Figure 7B:
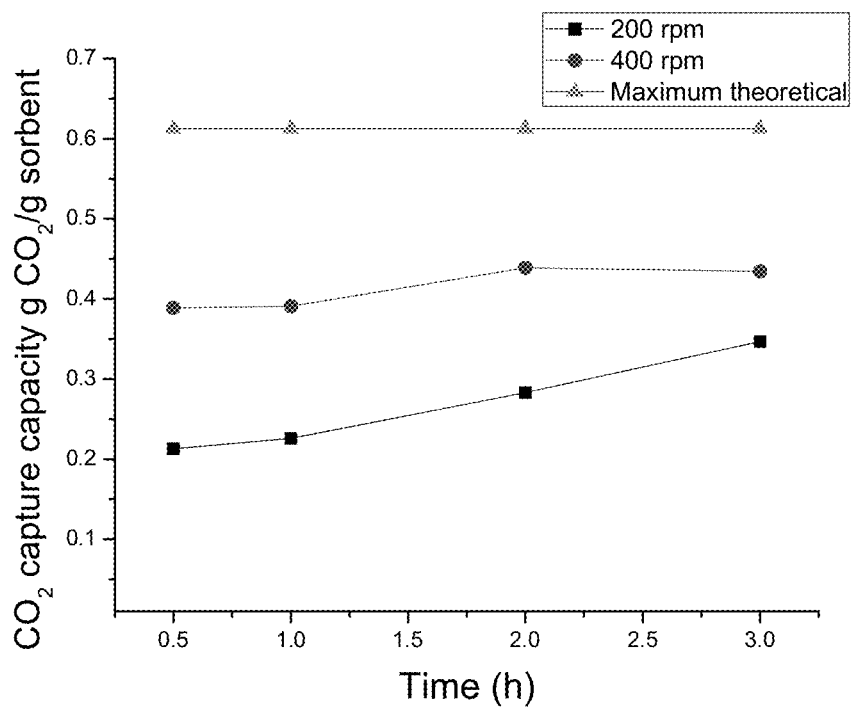

In mechanical ball milling, the reaction kinetics is strongly affected by revolution speed. FIGS. 7A and 7B depict $CO_2$ capture capacity at revolution speeds of 200 and 400 rpm as a function of the reaction time for the two systems. Siderite yield reaches 80% at 2 hours of milling in hematite and iron system. These results show that both $CO_2$ capture capacity and the formation of siderite increase with reaction time at a constant revolution speed, and that both $CO_2$ capture capacity and the formation of siderite increase with the increasing revolution speeds. Such behavior is observed in both systems. These results suggest that faster revolution speed transfers higher kinetic energy to the materials, promoting the formation of crystal defects such as stacking faults, dislocations, vacancies, and increased number of grain boundaries. These defects generate more active sites in magnetite, hematite and iron, which facilitates their reaction with $CO_2$.

In a ball mill, increasing the speed of rotation will increase the speed of the balls. Above a critical speed, the balls will be pinned to the inner walls of the jar and do not fall down to exert any impact force. Therefore, the maximum speed should be just below this critical value so that the balls fall down from the maximum height to produce the maximum collision energy. For example, the revolution speed of 200 and 400 rpm are below such a critical speed. Here faster speeds were not used because of industrial processes limitations.

Example 4—TG/DSC Study of Siderite Decomposition

Siderite decomposition reactions were studied on a sample of pure siderite obtained at 30 bar $CO_2$ pressure, 400 rpm and 36 h in the system $Fe_3O_4$—Fe—$CO_2$. The calcination temperature (absorbent regeneration) of siderite was experimentally identified using thermogravimetrical analysis.

The decomposition of $FeCO_3$ follows a two-step mechanism. Specifically, formation of non-stoichiometric wustite, FeO, in the first step of decomposition is followed by its transformation to other products depending on the experimental conditions, oxygen partial pressure, in particular.

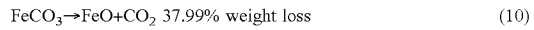
$FeCO_3 \rightarrow FeO+CO_2$ 37.99% weight loss (10)

The second-step reactions are listed below in the order of increasing oxygen partial pressure. Wustite is not thermodynamically stable below 563° C. and undergoes a disproportionation reaction in vacuum or inert atmosphere:

$4FeO \rightarrow Fe_3O_4+Fe$ no weight change (11)

Overall reaction of reactions (10) and (11):

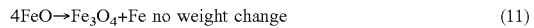
$4FeCO_3 \rightarrow Fe_3O_4+Fe+4CO_2$ 37.99% weight loss (7)

Wustite also can be oxidized by carbon dioxide produced in the reaction (10) according to reactions (12) and (14). Decomposition reactions of siderite (13) and (15) can also generate carbon dioxide:

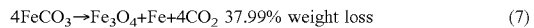
$3FeO+CO_2 \rightarrow Fe_3O_4+CO$ 7.42% weight gain (12)

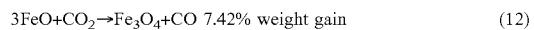
$3FeCO_3 \rightarrow Fe_3O_4+CO+2CO_2$ 33.39% weight loss (13)

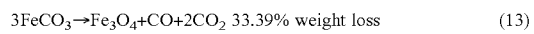
$2FeO+CO_2 \rightarrow Fe_2O_3+CO$ 11.14% weight gain (14)

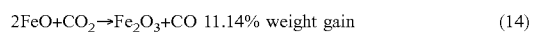
$2FeCO_3 \rightarrow Fe_2O_3+CO+CO_2$ 31.08% weight loss (15)

In the presence of oxygen, $FeCO_3$ oxidation takes place very rapidly, yielding hematite or magnetite (in moderately oxidative atmosphere):

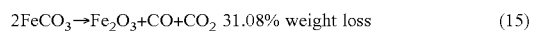
$3FeCO_3+\frac{1}{2}O_2 \rightarrow Fe_3O_4+3CO_2$ 33.39% weight loss (8)

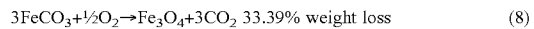
$4FeCO_3+O_2 \rightarrow 2Fe_2O_3+4CO_2$ 31.08% weight loss (9)

Moreover, $FeCO_3$ decomposition can also occur at low oxygen partial pressure in the presence of the carbon buffer:

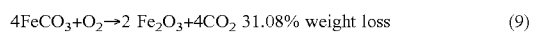
$3FeCO_3 \rightarrow Fe_3O_4+3C+5/2O_2$ 31.66% weight loss (16)

Figure 8A:
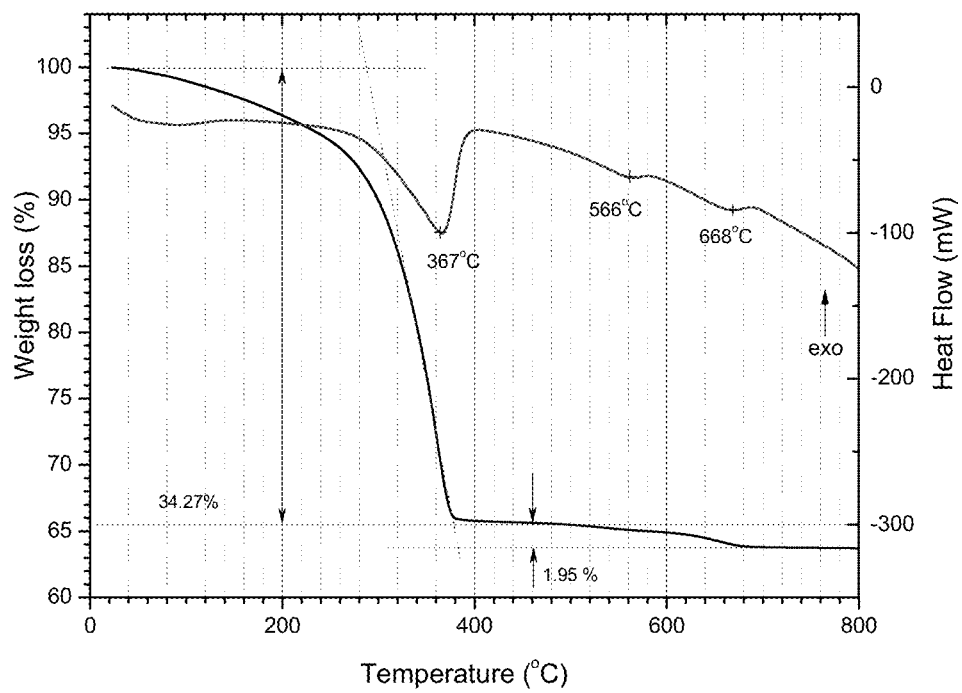
FIGS. 8A-8B show TG (black line)-DSC (red line) curves of siderite (formed in $Fe_3O_4$+Fe reaction at 30 bar $CO_2$ pressure, 400 rpm, 36 h) in Ar (8A) and air (8B) atmospheres at 10° C./min heating rate.
Figure 8B:
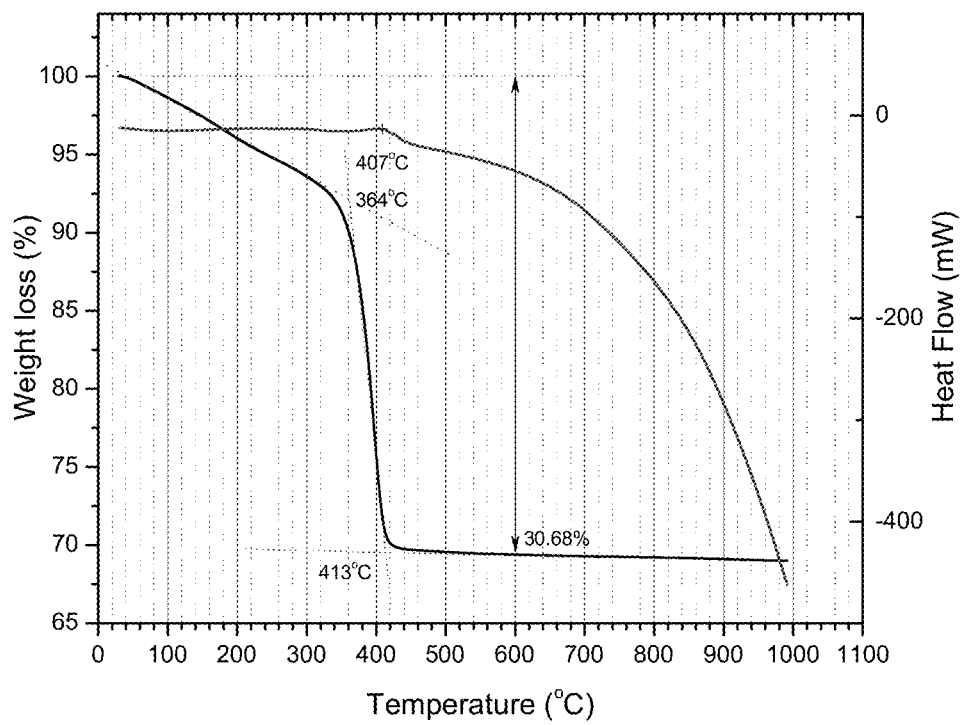

FIG. 8A shows the TG/DCS plot for the siderite decomposition in argon atmosphere. Endothermic peak at 367° C. can be assigned to the first step of siderite decomposition. According to the TG plot, the weight loss in the first step of siderite decomposition is 34.27% which is lower than predicted by reaction [10] 37.99%. The difference is due to the presence of small amount of unreacted Fe and $Fe_3O_4$. This amount can be calculated from TG curve of siderite decomposition in air atmosphere (FIG. 8B).

Decomposition of $FeCO_3$ in the air atmosphere is accompanied by iron oxidation to $Fe_2O_3$ according to reaction [9]. Theoretical weight loss in this reaction is 31.08%. FIG. 8B shows TG curve of $FeCO_3$ decomposition in the air atmosphere. Experimental weight loss is 30.68%, which is less than theoretical one. Siderite used in this TG experiment was produced by ball milling of equimolar mixture of $Fe_3O_4$ and Fe at 30 bar $CO_2$ pressure for 36 h. Difference between theoretical and measured weight loss in reaction [9] must be related to the presence in the siderite sample of unreacted equimolar mixture of $Fe_3O_4$ and Fe. Oxidation of both Fe and $Fe_3O_4$ are accompanied by the weight gain and the difference between theoretical and measured weight change in reaction [9] can be used to calculate amount of unreacted iron and magnetite. Calculations show that siderite contains 0.95 wt. % of equimolar mixture of Fe and $Fe_3O_4$.

Taking into account 0.95 wt. % of $Fe+Fe_3O_4$ as impurity in the siderite, the first decomposition step in argon atmosphere should be accompanied by 37.63% weight loss which is still larger than observed experimentally for siderite decomposition in Ar atmosphere loss of 34.27%. This evidences that the reaction of FeO formation from siderite, FeO disproportionation to Fe and $Fe_3O_4$, and oxidation of FeO by $CO_2$ must occur, simultaneously. Reaction [16] also should be considered as a possible pathway of $FeCO_3$ decomposition. Fe and $Fe_3O_4$ are stable below 550° C. and react with each other above 550° C., yielding FeO. Thus, endothermic peak observed on DSC curve in Ar atmosphere at 566° C. can be assigned to FeO re-formation from $Fe_3O_4$ and Fe. Small weight loss of 1.95% which is accompanied by observed endothermic peak at 668° C. could be related to $Fe_2O_3$ reduction by carbon.

Most of the reports on thermal decomposition of siderite refer to the natural mineral samples which are essentially solid solutions with Ca, Mg, and Mn carbonates. As noted above, these impurities affect siderite decomposition temperature and kinetics. For example, the decomposition of natural siderite with $(Fe_{0.7}Mg_{0.3})CO_3$ composition obeys n-order kinetic model and the synthetic one could be described by an Avrami-Erofeev law. Also, difference in the final decomposition products was observed. Natural siderite sample yields wustite phase of the composition $Fe_{0.7}Mg_{0.3}O$ and small amount of magnetite while products of synthetic siderite sample decomposition are magnetite and iron. Thermal decomposition of natural siderite in air atmosphere is in the temperature range 465° C.-550° C. (exothermic peak at 525° C.), 478° C.-580° C. (exothermic peak at 539° C.). In the inert atmosphere, decomposition temperature shifts slightly to lower temperature 438° C.-540° C. (endothermic peak at 500° C.). Kinetics of thermal decomposition of siderite in air atmosphere obeys three-dimensional diffusion model.

According to the thermogravimetric analysis in FIGS. 8A and 8B, the siderite decomposition and therefore the release of carbon dioxide occurs in the temperature range 300-410° C. Total weight loss in this range of temperature is 34.27%, translating the $CO_2$ capture capacity of sorbent at that condition to 0.5213 g $CO_2$/g sorbent or 11.84 mmol $CO_2$/g sorbent. This value is relatively close to the theoretical maximum (i.e., 13.91 mmol $CO_2$/g sorbent), demonstrating the high feasibility by mechanical ball milling method to capture $CO_2$.

Figure 9:
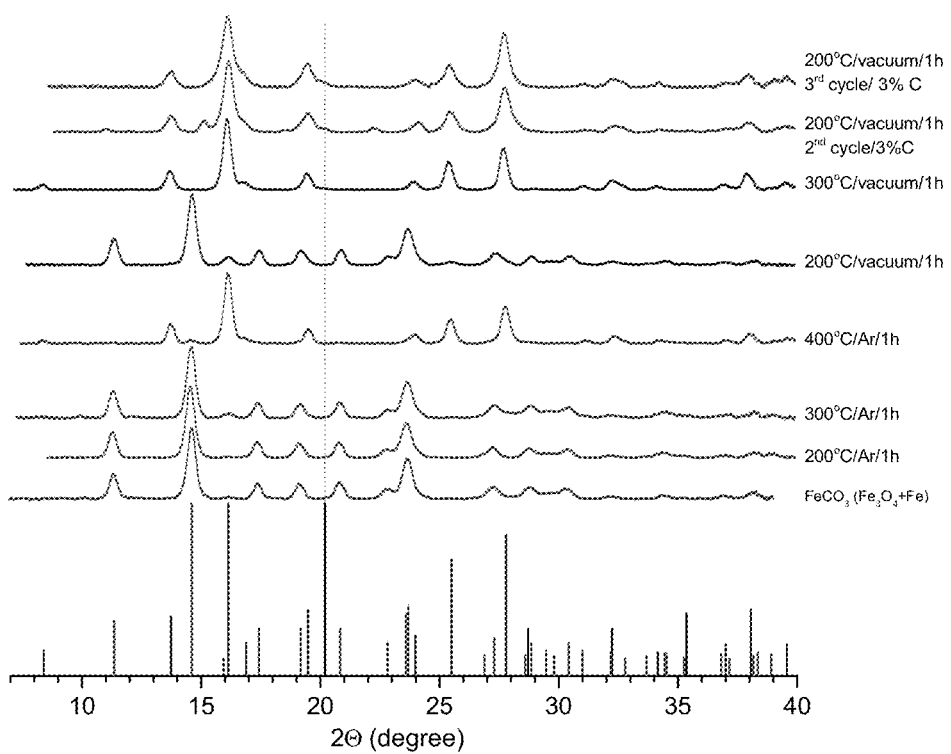
FIG. 9 shows the evolution of normalized X-ray diffraction patterns ($\lambda$=0.71073 Å) of $Fe_3O_4$+Fe mixture at 30 bar $CO_2$ pressure with time of ball milling. Plot at the bottom shows XRD patterns of Fe (JCPDS #006-0696; black), $Fe_3O_4$ (JCPDS #001-1111; blue) and $FeCO_3$ (JCPDS #029-0696; red). Red dotted lines show positions of the strongest diffraction peaks of siderite.

FIG. 9 shows the X-ray diffraction patterns of the products of siderite decomposition in Ar atmosphere and vacuum. Siderite starts decomposing above 300° C. in Ar atmosphere and above 200° C. in vacuum. Magnetite is detected as decomposition product of siderite in both conditions, and metallic iron is identified at vacuum. In addition to XRD, decomposition products were also characterized by Raman spectroscopy to test the presence of elemental carbon which could form in the $FeCO_3$ thermolysis reaction [16].

Raman spectroscopy is a widely used technique for characterizing the molecular morphology of carbon materials due to its high sensitivity to highly symmetric covalent bonds with little or no natural dipole moment. The carbon-carbon bonds that make up these materials fit this criterion perfectly. As a result, Raman spectroscopy is highly sensitive to these materials and able to provide a wealth of information about their structures. Every band in the Raman spectrum corresponds directly to a specific vibrational frequency of a bond within the molecule. For example, the 1582 $cm^{-1}$ band of graphite is known as the G band while Raman vibration at 1370 $cm^{-1}$ is disorder-induced mode of graphite (D mode).

Figure 10:
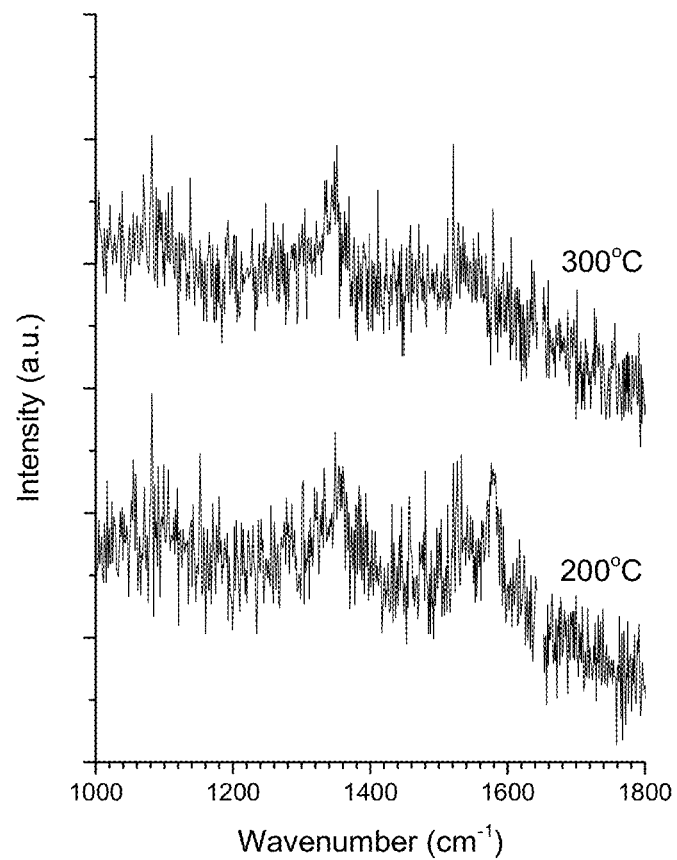
FIG. 10 depicts Raman patterns of siderite decomposition products at 200 and 300° C. in vacuum.

Siderite starts decomposing above 300° C. in Ar atmosphere and above 200° C. in vacuum. FIG. 10 shows Raman spectra of the products of siderite decomposition at 200° C. and 300° C. in vacuum. Characteristic peaks of graphite at 1582 $cm^{-1}$ and 1370 $cm^{-1}$ observed in this spectra confirm the presence of graphite in decomposition product (FIG. 10).

Figure 11:
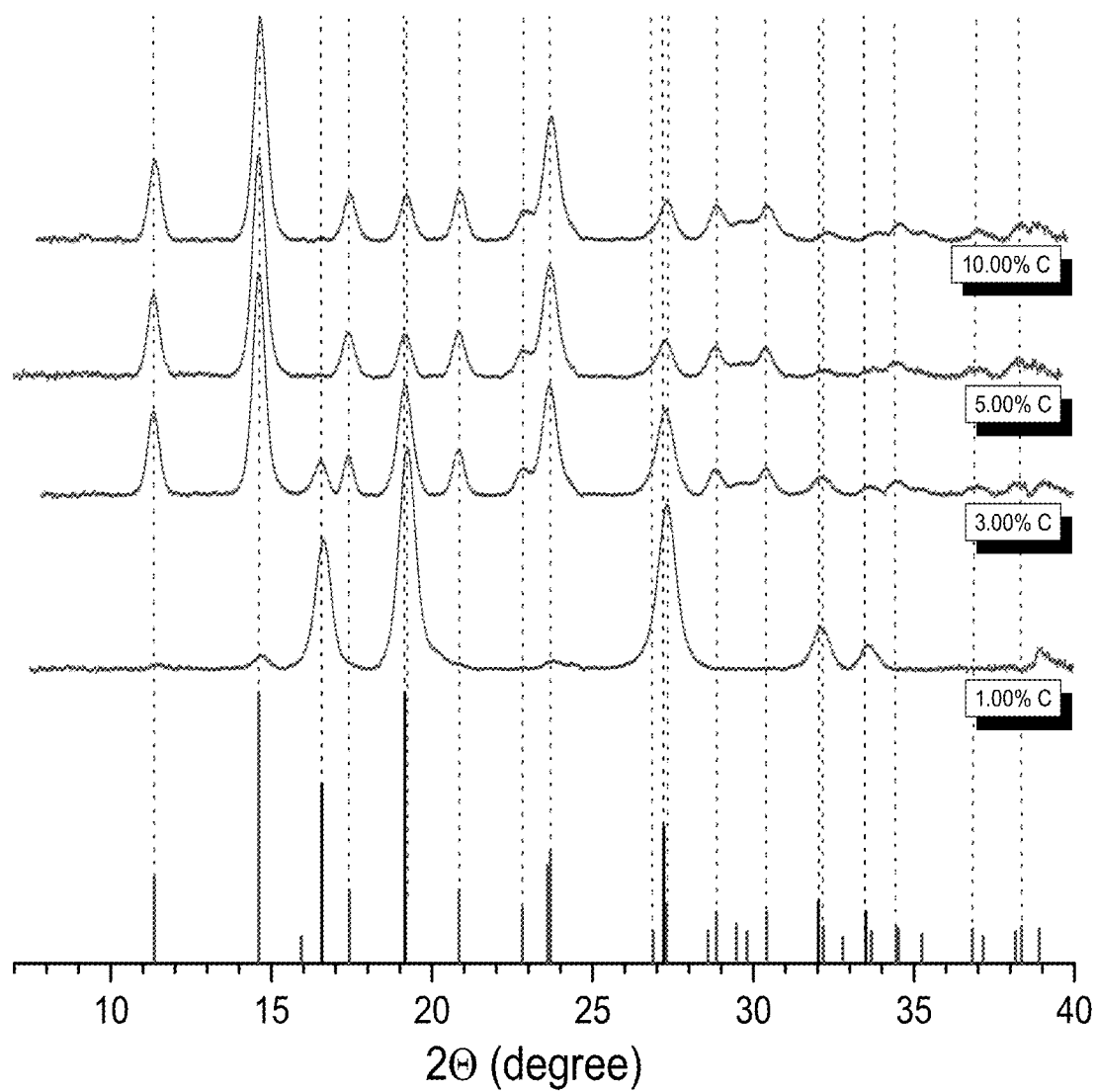
FIG. 11 illustrates XRD patterns ($\lambda$=0.71073 Å) of the products of the second carbonation cycles with different amounts of extra-graphite. FeO (JCPDS #085-0625; black), and $FeCO_3$ (JCPDS #029-0696; red).

Magnetite is detected as a decomposition product of siderite in both Ar atmosphere and vacuum conditions, while metallic iron is identified as one of the products of siderite decomposition in vacuum. These results indicated that FeO is an intermediate product of siderite thermolysis Example 5—Carbonation—Calcination Cycles Products of siderite decomposition were subsequently cycled in $CO_2$ absorption/release reactions. The capture capacity of the sorbent in the second carbonation cycle is significantly reduced due to the low content of reducing agent in the mixture. Reducing agent deficiency was compensated by adding to the sorbent carbon in the form of graphite. XRD patterns of the products that are formed in the second carbonation cycle with different amounts of graphite are shown in FIG. 11. The carbonation was performed at 400 rpm, 30 bar $CO_2$ pressure for 20 h in planetary ball mill. Addition of 1 mol. % of graphite to the mixture leads to the reduction of $Fe_3O_4$ to FeO. Very little yield of siderite was detected for 1 mol. % graphite loading. Increase in graphite loading above 3 mol. % facilitates carbonation reaction (FIG. 11). Pure siderite can be obtained in the second carbonation cycle with graphite content of 5.00 mol. %. Samples of $FeCO_3$ produced in the second and subsequent carbonation cycles were decomposed at 300° C. in vacuum.

Figure 12:
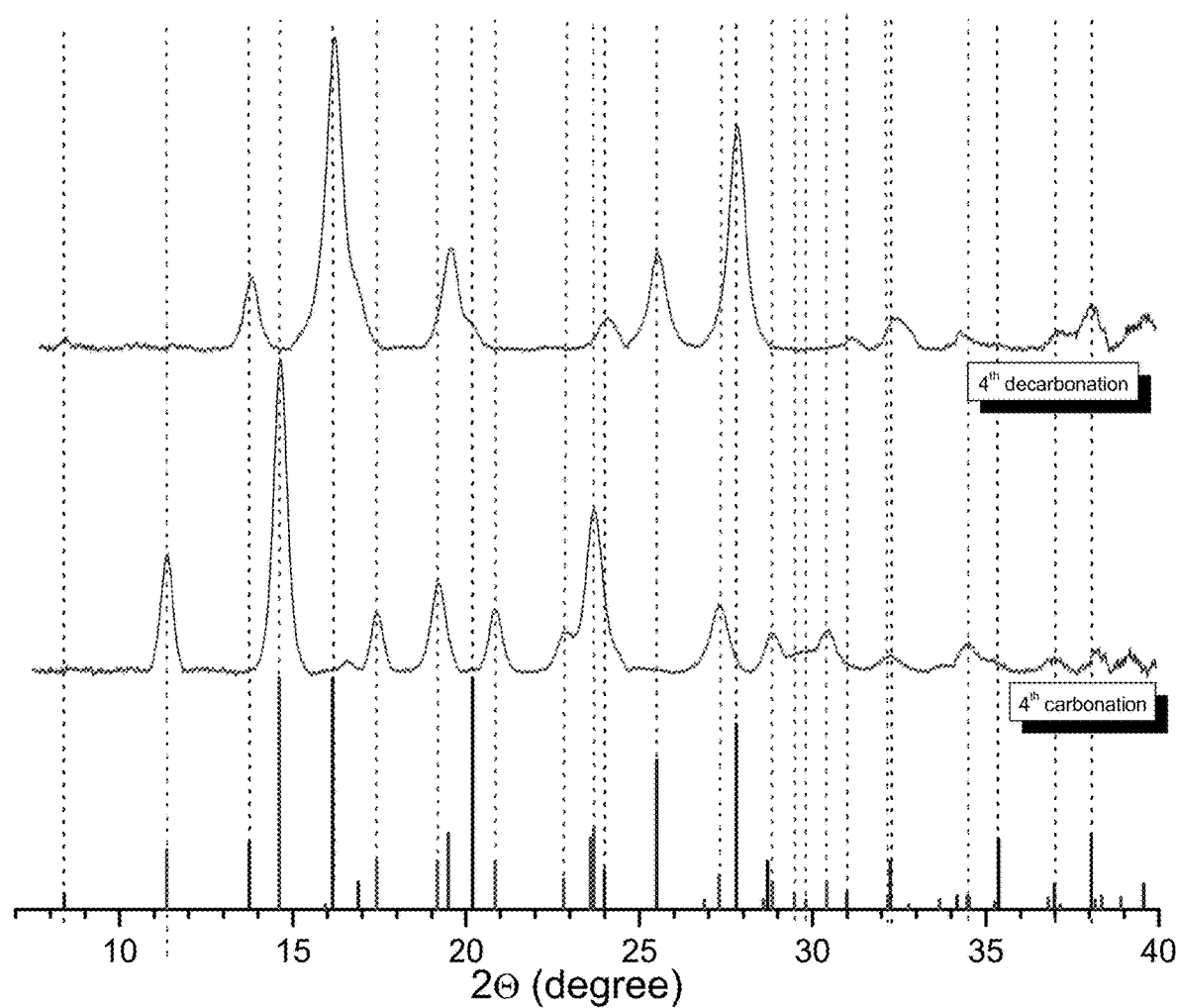
FIG. 12 shows the XRD patterns ($\lambda$=0.71073 Å) of siderite formation products after four cycles of carbonation and the products identified after calcination of the fourth cycle. $Fe_3O_4$ (JCPDS #001-1111; blue), Fe (JCPDS #006-0696; black) and $FeCO_3$ (JCPDS #029-0696; red).

Siderite with a yield close to 95% was formed during subsequent third and fourth carbonation. FIG. 12 shows XRD pattern of the products formed after the fourth cycle of carbonation, and the products after calcination at 300° C. in vacuum. The products of the fourth $CO_2$ desorption cycle were identified as $Fe_3O_4$, Fe, and graphite, which suggests that the material can be used in posterior $CO_2$ absorption/desorption cycles.

Table 1 shows pore volume and surface area of initial mixture of magnetite and iron, after 2 h of milling and after four cycles of carbonation-calcination. The surface area increases as a result of ball milling.

TABLE 1

Pore volume and surface area for initial mixture of magnetite and iron after 2 h of milling and four carbonation-calcination cycles.

| $Fe_3O_4$ + Fe | Surface area (m²/g) | Pore volume (cm³/g) |
| --- | --- | --- |
| Initial mixture | 4.66 | 0.013 |
| 2 h milled | 16.36 | 0.045 |
| After four cycles | 73.45 | 0.120 |

Noticeably, the surface area increases as a result of ball milling. The surface area after 4 cycles of carbonation and calcination is more than 15 times higher than surface area of initial $Fe_3O_4$+Fe mixture. Pore volume also increases with ball milling time.

Additionally, SEM reveals the appearance of material in the three states as mentioned above. FIG. 13A shows that the particles of iron and magnetite are identified in the untreated material. The iron particles are bigger and have spherical shape (FIG. 13A). The particle size of $Fe_3O_4$ is approx 300 nm, while the particle size of iron rises 2.5 µm. The agglomeration predominates in the material milled for 2 hours (FIG. 13B). Despite this agglomeration, the milled material is more homogeneous and has larger surface area and pore volume. The particle size of milled material is approx 380 nm. Bigger particle size and agglomeration in the milled material suggests that the tendency to cold welding predominates over fracture to conditions of 400 rpm revolution speed.

The carbonated and calcined material shows high discrepancy in the appearance of the particles. This material develops a broad range of particles size (0.1-30 μm) as in FIG. 13C, indicating that during the process, cold welding predominates over fracture. Formation of larger particles at 400 rpm after a long reaction time (more than 20 h per cycle) is due to three factors: (1) the lattice strain falls with the refinement, and hence the rate of cold welding is more than the rate of fracturing; (2) strong agglomerating force due to high energy per impact, and (3) the ductile nature of iron based components.

Example 6—Carbon Dioxide Capture by Iron Ore 3 g of iron ore comprising the chemical composition presented in Table 2 and 0.5 ml of water were used as initial mixture.

TABLE 2

| The chemical composition of iron ore in wt (%) | |
| --- | --- |
| Fe (total) | 46.98 |
| SiO$_2$ | 9.58 |
| CaO | 4.38 |
| Al$_2$O$_3$ | 5.43 |
| MgO | 0.43 |
| MnO | 0.23 |
| P$_2$O$_5$ | 2.72 |
| Na$_2$O | 0.59 |
| K$_2$O | 0.04 |
| S | 0.89 |
| Zn | 0.08 |

In iron ore, there are some impurities such as SiO$_2$, CaO, Al$_2$O$_3$, MgO, MnO, P$_2$O$_5$, Na$_2$O, K$_2$O, S and Zn. Among these impurities, sulfur in elemental form or as metal sulfide can act as reducing agents. Rietveld refinement shows that iron ore is composed of Fe$_2$O$_3$=48.02%, FeCO$_3$=21.15% and FeOOH=30.83%. Hence, iron ore can capture carbon dioxide through reactions [4] and [5].

The calculations of CO$_2$ capture capacity at various pressure, revolution speed and reaction time are shown in Table 3. The CO$_2$ capture capacity at the same temperature by iron ore increases as pressures and reaction times increase. Additionally, the siderite yield increases with increasing revolution speeds. In this case, water acts as a catalyst in carbonation process using metallic oxides.

TABLE 3

CO$_2$ capture capacity of iron ore at different conditions in the mechano-chemical process.

| Pressure (bar) | Revolution speed (rev/min) | Time reaction (h) | CO$_2$ capture capacity (mmol CO$_2$/g sorbent) |
| --- | --- | --- | --- |
| 10 | 400 | 3 | 1.075 |
| 10 | 400 | 6 | 1.9523 |
| 20 | 400 | 3 | 1.7545 |
| 20 | 400 | 6 | 2.9204 |
| 20 | 200 | 3 | 0.4318 |
| 30 | 200 | 3 | 0.6864 |
| 30 | 200 | 6 | 0.8545 |

Siderite decomposition temperature is higher (approximately 40° C. more) than the one identified for siderite formed from pure iron oxides due to temperature decomposition increases with decreasing purity.

Siderite was completely decomposed at 300° C. during 1 hour, forming magnetite and graphite as products, evidencing that reaction [6] occurs.

Decomposed siderite was studied in various cycles CO$_2$ absorption/release reactions, in order to confirm if the materials can be reused. Iron oxides were again carbonated adding water to the mixture. After recarbonation, samples were decomposed at 300° C. in vacuum during 1 hour. CO$_2$ capture capabilities were 4.1354, 6.2158 and 6.9611 mmol CO$_2$/g sorbent for second, third and fourth cycle respectively. Increases in CO$_2$ capture capacity with cycles, shows to mechano-chemical method as an efficient manner to capture carbon dioxide from iron ore.

Example 7—Carbon Dioxide Capture and Siderite Formation from Magnetite and Carbon 3 g of magnetite and graphite mixture were used in a molar ratio 2:1 (reaction [3]). Water (3 ml) was added to mixture from vessel walls. Magnetite carbonation is not accomplished in absence of water using graphite as reducing agent in mechano-chemical method due to kinetics limitations.

FIG. 14 depicts the thermodynamic feasibility of carbonation process for reaction [3], graphing equilibrium temperature as a function of pressure, including different amounts of water. The result shows that siderite stability depends strongly on the water amount in the mixture. Equilibrium temperature decreases as the water amount increases, making it possible for the regeneration of material at relatively low temperatures. The result shows that siderite decomposition occurs at temperatures lower than 100° C. in the presence of 15 mol of water.

Figure 15A:
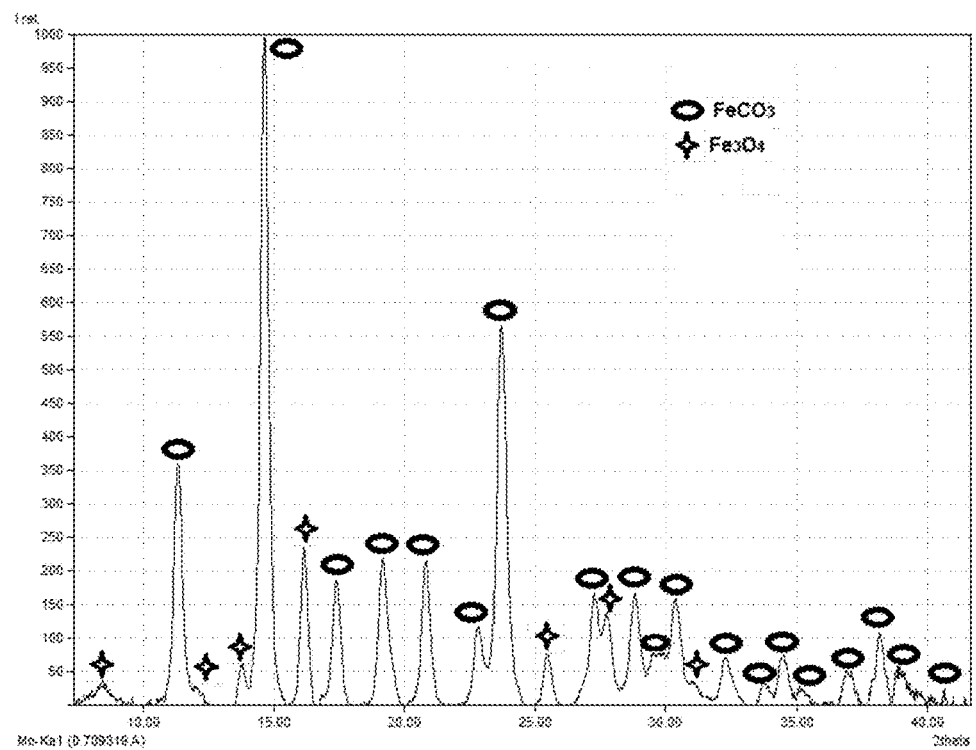
FIGS. 15A-15B show the XRD patterns ($\lambda=0.71073$ Å) of $Fe_3O_4+C$ mixture at 30 bar $CO_2$ pressure with a time of ball milling (400 rpm) for 36 hours (15A), and the products of siderite decomposition after 216 hours at room temperature conditions (20° C. and atmospheric pressure) (15B).

The XRD pattern for the reaction products of the mixture at 30 bar CO$_2$ pressure, 400 rpm planetary ball mill revolution speed and 36 h of milling is shown in FIG. 15A. The pattern reveals the presence of siderite as the main phase (85.86%) and a lower amount of magnetite (14.14%), which is equivalent to 0.4829 g CO$_2$/g sorbent capacity, translating to 78.82% of conversion taking account that theoretical CO$_2$ absorption capacity of Fe$_3$O$_4$—C mixture in 2:1 molar ration is 0.6126 g CO$_2$/g sorbent.

Partially carbonated sample was initially crushed using mortar and pestle. Then, it was extended on the mortar. Siderite decomposition at room temperature conditions (20° C. and 1010 mbar) was studied in air atmosphere.

Figure 15B:
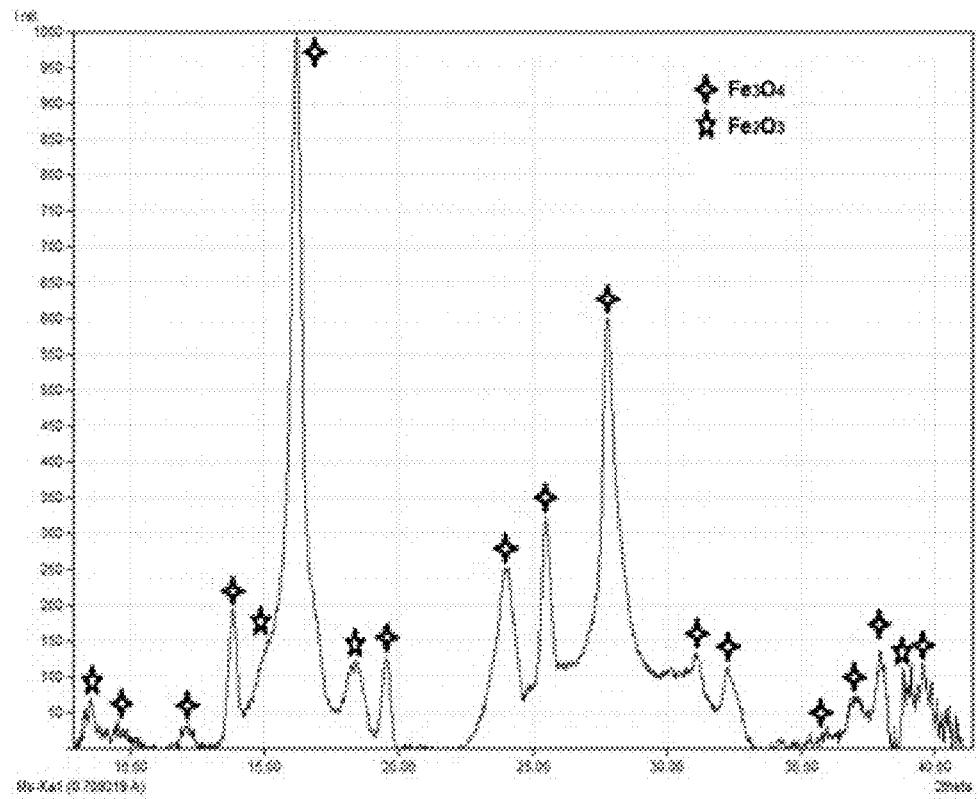

After 24 h, the amount of siderite in the sample is 68.48%, representing a decrease of approximately 17.38%, while the amount of magnetite increases, evidencing that reaction [8] were carried out. The sample were analyzed by taking X ray every 24 h. Table 4 presents the percentage calculations of siderite amount in the sample at different times of the spontaneous reaction to a maximum of 216 h (9 days). As can be seen at 216 h of spontaneous decomposition siderite has practically vanished. FIG. 15B presents the XRD pattern at these conditions. The pattern in FIG. 15 reveals that the presence of hematite associated siderite decomposition to magnetite oxidation, which is carried out at longer reaction times according reaction [17]:

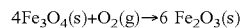

$$4Fe_3O_4(s) + O_2(g) \rightarrow 6\ Fe_2O_3(s) \qquad [17]$$

TABLE 4

The FeCO₃ weight percentage during siderite decomposition with time.

| Reaction time (h) | FeCO₃ weight percentage (%) |
|---|---|
| 24 | 68.48 |
| 48 | 52.59 |
| 72 | 37.13 |
| 96 | 29.35 |
| 120 | 21.96 |
| 144 | 15.64 |
| 168 | 9.98 |
| 192 | 4.88 |
| 216 | 0.77 |

Recyclability of products resulted from the siderite decomposition at room temperature conditions was studied. The kinetic limitation presented in second carbonation was compensated by adding a considerable amount of water (3 ml) to 3 g of regenerated iron oxides to accomplish carbonation again. Carbonation was studied at conditions of 30 bar $CO_2$ pressure, 400 rpm and for 36 h. Table 5 shows the extra substances added, transformation percentage, $CO_2$ capture capacity of sorbent and siderite percentage after 216 h of decomposition at room temperature condition in second, third and fourth cycles from the initial mixture of magnetite and carbon (reaction [3]) with water.

TABLE 5

Recyclability in spontaneous decomposition of siderite from $Fe_3O_4$—C—$CO_2$ system

| Cycle | Extra substances added | Transformation percentage (%) | $CO_2$ capture capacity (g $CO_2$/g sorbent) | FeCO₃ percentage after 216 (h) (%) |
|---|---|---|---|---|
| 2 | water, 3 ml | 85.48 | 0.5237 | 0.62 |
| 3 | water, 3 ml | 88.89 | 0.5446 | 0.43 |
| 4 | water, 3 ml | 91.27 | 0.5591 | 0.22 |

The results confirm that the regenerated iron oxides can be carbonated after each calcination performed at room temperature conditions. Higher capture levels are achieved with each subsequently carbonation. After 216 h, absence of siderite is evident, which allows to conclude that siderite decomposition kinetic is favored with the cycles taking account that the amount of siderite increases after each carbonation. Here, longer times of exposure of hydrated material to ball milling generate defects, lower diffusion distance, and higher surface area, allowing capturing and releasing easier the $CO_2$.

We claim:

1. A system for capturing carbon dioxide, comprising a carbonation reactor comprising a mixture of reaction materials, a first port for receiving the reaction materials, a second port for receiving a stream of gaseous carbon dioxide, and a grinding mechanism inside the carbonation reactor, the reaction materials comprising metal oxides and a reducing agent, the reaction materials reacting with carbon dioxide to form carbonates, wherein the first port is located at an upper end of the carbonation reactor and the second port is located at a lower end of the carbonation reactor, and the reducing agent being carbon; and a calcination reactor comprising a first port for receiving carbonates produced in the carbonation reactor, the carbonates being decomposed in the calcination reactor at room temperature conditions to reproduce the reaction materials, and a second port for releasing and recycling the reproduced reaction materials back to the carbonation reactor.

2. The system according to claim 1, the metal oxides comprising magnetite, hematite, wustite, and/or goethite.

3. The system according to claim 1, the grinding mechanism comprising grinding balls.

4. The system according to claim 1, the reaction materials and grinding mechanism having a weight ratio of 2:27.

5. The system according to claim 1, the reaction materials comprising water ranging from 1 mol to 20 mol.

6. The system according to claim 1, the carbonation reactor being rotated at a revolution speed ranging from about 100 rpm to 500 rpm.

7. The system according to claim 1, the carbonation reactor having an internal $CO_2$ pressure of 10, 20 or 30 bar.

8. The system according to claim 1, the carbonation reactor having an internal temperature ranging from about 20 to about 600° C.

9. The system according to claim 1, the metal oxides comprising—magnetite.

10. The system according to claim 1, which further comprises a sonication unit comprising one or more ultrasound transducers.

11. A system for capturing carbon dioxide, comprising a carbonation reactor comprising 1) a mixture of reaction materials, the reaction materials comprising water, magnetite and carbon; 2) a first port for receiving the reaction materials, wherein the first port is located at an upper end of the carbonation reactor; 3) a second port for receiving a stream of gaseous carbon dioxide, wherein the second port is located at a lower end of the carbonation reactor, and 4) a grinding mechanism inside the carbonation reactor, the reaction materials reacting with carbon dioxide to form siderite; and a calcination reactor comprising a first port for receiving siderite produced in the carbonation reactor, the siderite being decomposed in the calcination reactor at room temperature conditions to reproduce $Fe_3O_4$ and C, and a second port for releasing and recycling the $Fe_3O_4$ and C back to the carbonation reactor.

12. The system according to claim 11, the carbonation reactor having an internal $CO_2$ pressure of 10, 20 or 30 bar.

13. The system according to claim 11, the carbonation reactor having an internal temperature ranging from about 20 to about 600° C.

14. The system according to claim 11, the carbonation reactor being rotated at a revolution speed ranging from about 100 rpm to 500 rpm.

15. A system for capturing carbon dioxide, comprising a carbonation reactor comprising a mixture of reaction materials, the reaction materials comprising water, magnetite and carbon; a first port for receiving the reaction materials, the first port being located at an upper end of the carbonation reactor; a second port for receiving a stream of gaseous carbon dioxide, the second port being located at a lower end of the carbonation reactor; a grinding mechanism inside the carbonation reactor, the reaction materials reacting with carbon dioxide to form carbonates; a sonication unit on the wall of the carbonation reactor, the sonication unit comprising one or more ultrasounic transducers; and a third port for obtaining carbonates.

16. A method for capturing carbon dioxide comprising passing a stream of gas comprising carbon dioxide through the system of claim 1.

17. A method for capturing carbon dioxide comprising passing a stream of gas comprising carbon dioxide through the system of claim 11.

18. A method for capturing carbon dioxide comprising passing a stream of gas comprising carbon dioxide through the system of claim 15.

19. The system according to claim 15, the carbonation reactor being rotated at a revolution speed ranging from about 100 rpm to 500 rpm.

20. The system according to claim 1, the carbon being selected from graphite, coal, coke, charcoal, and soot.

* * * * *